(12) United States Patent
Nishio et al.

(10) Patent No.: US 12,363,694 B2
(45) Date of Patent: *Jul. 15, 2025

(54) INTEGRATED CIRCUIT

(71) Applicant: Sun Patent Trust, New York, NY (US)

(72) Inventors: Akihiko Nishio, Osaka (JP); Seigo Nakao, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,206

(22) Filed: May 14, 2024

(65) Prior Publication Data

US 2024/0298310 A1    Sep. 5, 2024

Related U.S. Application Data

(63) Continuation of application No. 18/319,524, filed on May 18, 2023, now Pat. No. 12,022,454, which is a
(Continued)

(30) Foreign Application Priority Data

Aug. 17, 2009    (JP) .................. 2009-188721

(51) Int. Cl.
*H04W 72/0453*    (2023.01)
*H04L 1/00*    (2006.01)
(Continued)

(52) U.S. Cl.
CPC ....... *H04W 72/0453* (2013.01); *H04L 1/0038* (2013.01); *H04L 5/0007* (2013.01);
(Continued)

(58) Field of Classification Search
None
See application file for complete search history.

(56) References Cited

U.S. PATENT DOCUMENTS 8,570,969 B2    10/2013    Kim et al.
8,675,626 B2    3/2014    Nakao et al.
(Continued)

OTHER PUBLICATIONS

Translation of International Search Report for PCT/JP2010/005070 dated Nov. 9, 2010.
(Continued)

*Primary Examiner* — Otis L Thompson, Jr.
(74) *Attorney, Agent, or Firm* — Seed IP Law Group LLP

(57) ABSTRACT

A wireless communication base station device which makes it possible to provide a base station, terminal and CCE allocation method capable of reducing the number of times blind decoding of a terminal is performed, without increasing the CCE block rate, even when a plurality of unit bands are set in a terminal. In this device, a search space setting section (103) sets in each of a plurality of unit bands a common search space in respect of a terminal which is communicating using the plurality of unit bands and other terminals, and sets in each of the plurality of unit bands an individual search space in respect of the terminal. An allocation section (106) allocates control information solely to CCEs within the common search spaces set in specified unit bands among the plurality of unit bands, or solely to CCEs within individual search spaces set in specified unit bands.

10 Claims, 8 Drawing Sheets

Related U.S. Application Data continuation of application No. 16/856,368, filed on Apr. 23, 2020, now Pat. No. 11,696,268, which is a continuation of application No. 16/245,944, filed on Jan. 11, 2019, now Pat. No. 10,674,511, which is a continuation of application No. 15/634,376, filed on Jun. 27, 2017, now Pat. No. 10,219,276, which is a continuation of application No. 15/098,623, filed on Apr. 14, 2016, now Pat. No. 9,730,225, which is a continuation of application No. 13/388,473, filed as application No. PCT/JP2010/005070 on Aug. 16, 2010, now Pat. No. 9,350,486.

(51) Int. Cl.
*H04L 5/00* (2006.01)
*H04W 72/23* (2023.01)

(52) U.S. Cl.
CPC ............ *H04L 5/003* (2013.01); *H04L 5/0053* (2013.01); *H04L 5/0055* (2013.01); *H04W 72/23* (2023.01); *H04L 1/0025* (2013.01)

(56) References Cited

U.S. PATENT DOCUMENTS

| | | | |
|---|---|---|---|
| 9,178,676 | B2 | 11/2015 | Kim et al. |
| 2009/0305698 | A1 | 12/2009 | Zhang et al. |
| 2010/0135237 | A1* | 6/2010 | Papasakellariou .... H04W 72/04 455/450 |
| 2010/0215011 | A1 | 8/2010 | Pan et al. |
| 2010/0254329 | A1* | 10/2010 | Pan ........................ H04L 5/0094 370/329 |
| 2010/0304689 | A1 | 12/2010 | Mcbeath et al. |
| 2011/0103509 | A1 | 5/2011 | Chen et al. |
| 2011/0110316 | A1 | 5/2011 | Chen et al. |
| 2011/0110441 | A1 | 5/2011 | Chen et al. |
| 2011/0128922 | A1 | 6/2011 | Chen et al. |
| 2011/0128933 | A1 | 6/2011 | Chen et al. |
| 2011/0194501 | A1 | 8/2011 | Chung et al. |
| 2011/0201333 | A1 | 8/2011 | Kwon et al. |
| 2012/0021756 | A1* | 1/2012 | Kwon ..................... H04L 5/0053 455/450 |
| 2012/0033627 | A1 | 2/2012 | Li et al. |
| 2012/0044899 | A1* | 2/2012 | Kwon ..................... H04L 5/0094 370/329 |
| 2012/0051306 | A1* | 3/2012 | Chung .................. H04L 5/0094 370/329 |
| 2012/0078933 | A1 | 3/2012 | Kim et al. |
| 2012/0099518 | A1 | 4/2012 | Park et al. |
| 2012/0113941 | A1* | 5/2012 | Chung .................. H04L 5/0091 370/329 |
| 2013/0044605 | A1 | 2/2013 | Lee et al. |
| 2013/0195039 | A1 | 8/2013 | Pan et al. |
| 2014/0185555 | A1* | 7/2014 | Nakao ................... H04W 72/23 370/329 |
| 2015/0208398 | A1 | 7/2015 | Pan et al. |
| 2016/0234843 | A1* | 8/2016 | Nishio .................. H04L 5/0053 |
| 2023/0370135 | A1 | 11/2023 | Haustein et al. |
| 2023/0379079 | A1 | 11/2023 | Bressanelli et al. |

OTHER PUBLICATIONS

"PDCCH Search Space for Carrier Aggregation", 3GPP TSG RAN WG1 Meeting #57bis, Los Angeles, USA, Jun. 29-Jul. 3, 2009, R1-092348.

"Downlink Control Structure for LTE-A", 3GPP TSG-RAN WG1 meeting #56, Feb. 9-13, 2009, Athens, Greece, R1-090628.

3GPP TS 36.211 V8.7.0, "Physical Channels and Modulation (Release 8)", May 2009.

3GPP TS 36.212 V8.7.0, "Multiplexing and channel coding (Release 8)", May 2009.

3GPP TS 36.213 V8.7.0, "Physical layer procedures (Release 8)", May 2009.

"PDCCH design for Carrier aggregation and Post Rel-8 feature", 3GPP TSG RAN1 #57bis, Los Angeles, USA, Jun. 29-Jul. 3, 2009, R1-092641.

"Primary and Secondary PDCCH Design for LTE-A", 3GPP TSG-RAN WG1 meeting #57, May 4-8, 2009, San Francisco, USA, R1-092227.

"Control Channel Structure Extension for Post Release 8 LTE", 3GPP TSG RAN1 #57a, San Francisco, USA, May 4-8, 2009, R1-091944.

U.S. Appl. No. 61/155,811, Pan et al., "Method and Procedures for PDCCH Switching in LTE-Advanced Radio Access Systems", Feb. 26, 2009 (Year: 2009).

U.S. Appl. No. 61/218,306, Pan et al., "Method and Apparatus for PDCCH Switching in LTE-Advanced Radio Access Systems", Jun. 18, 2009 (Year: 2009).

* cited by examiner

INTEGRATED CIRCUIT

CROSS-REFERENCE TO RELATED APPLICATIONS

This is a continuation of U.S. patent application Ser. No. 18/319,524 filed on May 18, 2023, which is a continuation of U.S. patent application Ser. No. 16/856,368 filed on Apr. 23, 2020, which is a continuation of U.S. patent application Ser. No. 16/245,944 filed on Jan. 11, 2019, which is a continuation of U.S. patent application Ser. No. 15/634,376 filed on Jun. 27, 2017, entitled INTEGRATED CIRCUIT", which is a continuation of U.S. patent application Ser. No. 15/098,623 filed on Apr. 14, 2016, entitled "TERMINAL APPARATUS AND COMMUNICATION METHOD" which is a continuation of U.S. patent application Ser. No. 13/388,473, filed on Feb. 2, 2012, entitled "WIRELESS COMMUNICATION BASE STATION DEVICE, WIRELESS COMMUNICATION TERMINAL DEVICE, CCE ALLOCATION METHOD AND CCE BLIND DECODING METHOD", which is the National Stage Entry of PCT/JP2010/005070, filed on Aug. 16, 2010, which claims benefit of Japanese Patent Application No. 2009-188721 filed on Aug. 17, 2009, the entireties of which are incorporated herein by reference.

TECHNICAL FIELD

The present invention relates to a radio communication base station apparatus, radio communication terminal apparatus, CCE assignment method and CCE blind decoding method.

BACKGROUND ART

In 3GPP-LTE (3rd Generation Partnership Project Radio Access Long Term Evolution, hereinafter referred to as "LTE"), OFDMA (Orthogonal Frequency Division Multiple Access) is used as a downlink communication method, and SC-FDMA (Single Carrier Frequency Division Multiple Access) is used as an uplink communication method (see Non-Patent Literatures 1, 2, and 3, for example).

In LTE, a radio communication base station apparatus (hereinafter abbreviated to "base station") performs communication by assigning resource blocks (RB) within a system band to a radio communication terminal apparatus (hereinafter abbreviated to "terminal") in time units called "subframes." Also, a base station transmits assignment control information (L1/L2 control information) for notifying downlink data and uplink data resource assignment results to a terminal. This assignment control information is transmitted to a terminal using a downlink control channel such as a PDCCH (Physical Downlink Control Channel), for example. Here, each PDCCH occupies a resource comprising one or a continuous plurality of CCEs (Control Channel Elements). In LTE, a number of CCEs occupied by a PDCCH (linked number of CCEs: CCE aggregation level) is selected as one of 1, 2, 4, or 8, according to the number of information bits of assignment control information or the channel state of a terminal. In LTE, a frequency band having a maximum width of 20 MHz is supported as a system bandwidth.

Also, a base station transmits a plurality of PDCCHs simultaneously in order to assign a plurality of terminals to one subframe. At this time, the base station transmits a CRC bit masked (or scrambled) by a transmission-destination terminal ID, included in a PDCCH, in order to identify a transmission-destination terminal of each PDCCH. Then a terminal performs blind decoding of a PDCCH by demasking (or descrambling) a CRC bit with that terminal's terminal ID in a plurality of PDCCHs for which there is a possibility of that terminal being addressed.

Furthermore, assignment control information transmitted from the base station is called "DCI (Downlink Control Information)" and includes information on resources assigned by the base station to the terminal (resource assignment information) and MCS (Modulation and channel Coding Scheme) or the like. The DCI has a plurality of formats for uplink, for downlink MIMO (Multiple Input Multiple Output) transmission and for downlink non-continuous band assignment or the like. The terminal needs to receive both downlink assignment control information (downlink-related assignment control information) and uplink assignment control information (uplink-related assignment control information) having a plurality of formats.

For example, the downlink assignment control information defines formats in a plurality of sizes according to a transmitting antenna control method and resource assignment method or the like of the base station. Of the plurality of formats, a downlink assignment control information format for performing continuous band assignment (hereinafter simply referred to as "downlink assignment control information") and an uplink assignment control information format for performing continuous band assignment (hereinafter simply referred to as "uplink assignment control information") have the same size. These formats (DCI formats) include type information (e.g., 1-bit flag) indicating the type of assignment control information (downlink assignment control information or uplink assignment control information). Thus, even when the DCI size indicating the downlink assignment control information and the DCI size indicating the uplink assignment control information are the same, the terminal can identify whether the assignment control information is the downlink assignment control information or uplink assignment control information by checking the type information included in the assignment control information.

The DCI format used when uplink assignment control information for performing continuous band assignment is transmitted is called "DCI format 0" (hereinafter referred to as "DCI 0") and the DCI format used when downlink assignment control information for performing continuous band assignment is transmitted is called "DCI format 1A" (hereinafter referred to as "DCI 1A"). As described above, DCI 0 and DCI 1A have the same size and can be distinguished by type information, and therefore DCI 0 and DCI 1A will be represented collectively as "DCI 0/1A."

In addition to the above-described DCI formats, there are DCI format 1 (hereinafter referred to as "DCI 1") for performing non-continuous band assignment on a downlink and DCI formats 2 and 2A (hereinafter referred to as "DCI 2 and 2A" for assigning spatial multiplexing MIMO transmission. Here, DCI 1, 2 and 2A are formats used in dependence on the downlink transmission mode of the terminal (non-continuous band assignment or spatial multiplexing MIMO transmission) and are formats set for each terminal. On the other hand, DCI 0/1A is a format independent of the transmission mode, format that can be used for a terminal in any transmission mode, that is, format that can be used commonly for all terminals. Furthermore, when DCI 0/1A is used, 1 antenna transmission or transmission diversity is used as a default transmission mode.

Furthermore, a method has been investigated that limits CCEs subject to blind decoding for each terminal in order to decrease the number of blind decoding operations to reduce the circuit scale of a terminal. With this method, a CCE area (hereinafter referred to as "search space") that is subject to blind decoding is limited for each terminal. In LTE, a search space is set randomly for each terminal, and a number of CCEs included within a search space is defined for each PDCCH CCE aggregation level. For example, for CCE aggregation levels 1, 2, 4, and 8, respectively, the number of CCEs included within a search space, that is, the number of CCEs subject to blind decoding, is limited to six candidates (6 (=1×6) CCEs), six candidates (12 (=2×6) CCEs), two candidates (8 (=4×2) CCEs), and two candidates (16 (=8×2) CCEs), respectively. By this means, each terminal need only perform blind decoding on CCEs within a search space assigned to that terminal, enabling the number of blind decoding operations to be decreased. Here, a search space of each terminal is set using a terminal ID of each terminal, and a hash function, which is a function that performs randomization. This terminal-specific CCE area is called "UE specific Search Space (UE-SS)."

On the other hand, a PDCCH also includes control information for data assignment common to terminals simultaneously reported to a plurality of terminals (e.g., assignment information related to a downlink broadcast signal and assignment information related to a paging signal) (hereinafter also referred to as "control information for shared channels"). In order to transmit control information for shared channels, a CCE area (hereinafter also referred to as "Common Search Space: C-SS") common to all terminals that should receive a downlink broadcast signal is used for a PDCCH. In C-SS, for CCE aggregation levels 4 and 8, respectively, there are four candidates (16 (=4×4) CCEs) and two candidates (16=(8×2) CCEs), a total of six candidates for CCEs subject to blind decoding.

Furthermore, the terminal performs blind decoding on each of DCI formats in two sizes in a UE-SS; DCI format (DCI 0/1A) commonly used for all terminals and DCI formats (DCI 1, 2, 2A) dependent on a transmission mode. For example, the terminal performs 16 blind decoding operations for each of PDCCHs in two sizes within a UE-SS. Furthermore, the terminal performs six blind decoding operations described above on each of DCI format 1C (hereinafter also referred to as "DCI 1C") which is a format for shared channel assignment and DCI 1A (that is, a total of 12 blind decoding operations).

Here, DCI 1A used for shared channel assignment and DCI 0/1A used for terminal-specific data assignment have the same size and are distinguished from each other by terminal IDs. Therefore, the base station can transmit DCI 0/1A for performing terminal-specific data assignment also with a C-SS without increasing the number of blind decoding operations by the terminal.

Also, standardization has begun on 3GPP LTE-Advanced (hereinafter referred to as "LTE-A"), which implements still higher communication speeds than LTE. In LTE-A, a maximum downlink transmission speed of 1 Gbps or above and a maximum uplink transmission speed of 500 Mbps or above are implemented, offering the prospect of base stations and terminals (hereinafter referred to as "LTE-A terminals") capable of communication at a wideband frequency of 40 MHz or above being introduced. Also, an LTE-A system is required to accommodate not only LTE-A terminals but also terminals compatible with an LTE system (hereinafter referred to as "LTE terminals").

In LTE-A, a band aggregation method has been proposed whereby a plurality of frequency bands are aggregated in performing communication in order to implement wideband communication of 40 MHz or above (see Non-Patent Literature 1, for example). For example, a frequency band having a width of 20 MHz is assumed as a basic communication band unit (hereinafter referred to as a "component band"). Therefore, in LTE-A, for example, a 40 MHz system bandwidth is implemented by aggregating two component bands. Also, both an LTE terminal and an LTE-A terminal can be accommodated in one component band.

In LTE-A, when data is assigned to a plurality of component bands for a certain terminal, assignment control information is notified through a plurality of PDCCHs. That is, the resource assignment result of a plurality of component bands is notified using one PDCCH for each component band.

In LTE-A, a transmission method using non-continuous band assignment and a transmission method using MIMO are newly introduced as uplink transmission methods. As a result, studies are being carried out on a definition of new DCI formats (e.g., DCI formats 0A, 0B (hereinafter also referred to as "DCI 0A and 0B")) (see Non-Patent Literature 4, for example). That is, DCI 0A and 0B are DCI formats in dependence on an uplink transmission mode.

CITATION LIST

Non-Patent Literature

NPL 1
3GPP TS 36.211 V8.7.0, "Physical Channels and Modulation (Release 8)," 2009 May NPL 2
3GPP TS 36.212 V8.7.0, "Multiplexing and channel coding (Release 8)," 2009 May NPL 3
3GPP TS 36.213 V8.7.0, "Physical layer procedures (Release 8)," 2009 May NPL 4
3GPP TSG RAN WG1 meeting, R1-092641, "PDCCH design for Carrier aggregation and Post Rel-8 feature," June 2009

SUMMARY OF INVENTION

Technical Problem

As described above, in LTE-A, when DCI formats in dependence on a downlink transmission mode (DCI 1, 2, 2A), DCI formats in dependence on an uplink transmission mode (DCI 0A, 0B) and a DCI format common to all terminals without depending on any transmission mode (DCI 0/1A) are used within a UE-SS, the terminal performs blind decoding (monitoring) on PDCCHs in the above-described three types of DCI format. For example, as described above, since a UE-SS requires 16 blind decoding operations per type of DCI format, the blind decoding count within the UE-SS amounts to a total of 48 times (=16 times×3 types). Therefore, when 12 times (=6 times×2 types), which is the blind decoding count for two types of DCI format within a C-SS is added, a total of 60 times of blind decoding operations are necessary.

Here, when a plurality of component bands are set for one terminal, a C-SS and UE-SS may be set in each component band as described above. In this case, the blind decoding count at the terminal becomes enormous, increasing the circuit scale and power consumption of the terminal. When, for example, five component bands are set for one terminal, the terminal requires a total of 300 times (=60 times×5) of blind decoding operations.

Furthermore, the blind decoding count (that is, the number of CCE candidates) per component band may be reduced uniformly among a plurality of component bands to reduce the blind decoding count at the terminal. However, CCEs in each component band are used in contention among a plurality of terminals. For this reason, when the number of terminals as assignment targets is large, if the number of CCE candidates available per terminal decreases, all CCEs within a search space may be used for other terminals, increasing a probability (referred to as "CCE block rate") that terminals can no longer be assigned).

It is an object of the present invention to provide a base station, terminal, CCE assignment method and CCE blind decoding method capable of reducing a blind decoding count of a terminal without increasing a CCE block rate even when a plurality of component bands are configured for the terminal.

Solution to Problem

A base station according to the present invention adopts a configuration including a setting section that sets a common search space for a radio communication terminal apparatus communicating using a plurality of component bands and other radio communication terminal apparatuses for each of the plurality of component bands and sets a specific search space for the radio communication terminal apparatus for each of the plurality of component bands, and an assignment section that assigns control information addressed to the radio communication terminal apparatus to CCEs within the common search space or CCEs within the specific search space, wherein the assignment section assigns the control information only to CCEs within the common search space set in a specific component band or CCEs within the specific search space set in the specific component band among the plurality of component bands, or assigns the control information only to CCEs within the common search space among the common search spaces and the specific search spaces set in the plurality of component bands respectively.

A terminal according to the present invention is a radio communication terminal apparatus that communicates using a plurality of component bands and adopts a configuration including a reception section that receives control information assigned to a common search space set for the radio communication terminal apparatus and other radio communication terminal apparatuses for each of the plurality of component bands and a specific search space set for the radio communication terminal apparatus for each of the plurality of component bands, a calculation section that calculates the specific search space set in the radio communication terminal apparatus, and a decoding section that performs blind decoding on CCEs within the common search space or CCEs within the specific search space, to obtain the control information for the radio communication terminal apparatus, wherein the decoding section performs blind decoding only on CCEs within the common search space set in a specific component band and CCEs within the specific search space set in the specific component band among the plurality of component bands or performs blind decoding only on CCEs within the common search space among the common search spaces and the specific search spaces set in the plurality of component bands respectively.

A CCE assignment method according to the present invention includes a setting step of setting a common search space for a radio communication terminal apparatus communicating using a plurality of component bands and other radio communication terminal apparatuses for each of the plurality of component bands and setting a specific search space for the radio communication terminal apparatus for each of the plurality of component bands, and an assigning step of assigning control information addressed to the radio communication terminal apparatus to CCEs within the common search space or CCEs within the specific search space, wherein in the assigning step, the control information is assigned only to CCEs within the common search space set in a specific component band or CCEs within the specific search space set in the specific component band among the plurality of component bands or the control information is assigned only to CCEs within the common search space among the common search spaces and the specific search spaces set in the plurality of component bands respectively.

A CCE blind decoding method according to the present invention is a CCE blind decoding method for a radio communication terminal apparatus communicating using a plurality of component bands and other radio communication terminal apparatuses and includes a receiving step of receiving control information assigned to a common search space set in each of the plurality of component bands and a specific search space set in each of the plurality of component bands for the radio communication terminal apparatus and the other radio communication terminal apparatuses, a calculating step of calculating the specific search space set in the radio communication terminal apparatus, and a decoding step of blind decoding CCEs within the common search space or CCEs within the specific search space and thereby obtaining the control information addressed to the radio communication terminal apparatus, wherein in the decoding step, blind decoding is performed only on CCEs within the common search space set in a specific component band and CCEs within the specific search space set in the specific component band among the plurality of component bands or blind decoding is performed only on CCEs within the common search space among the common search spaces and the specific search spaces set in the plurality of component bands respectively.

Advantageous Effects of Invention

The present invention can reduce a blind decoding count of a terminal even when a plurality of component bands are set for the terminal without increasing a CCE block rate.

DESCRIPTION OF EMBODIMENTS

Now, embodiments of the present invention will be described in detail with reference to the accompanying drawings. In the embodiments, identical configuration elements are assigned the same reference codes, and duplicate descriptions thereof are omitted.

Furthermore, in the following descriptions, DCI 1C and 1A will be used as DCI formats for shared channel assignment, DCI 0/1A will be used as a DCI format for data assignment which is a default transmission mode commonly used for all terminals (usable for terminals in any transmission mode independently of the transmission mode), DCI 0A and 0B will be used as DCI formats for data assignment which depend on an uplink transmission mode and DCI 1, 2, and 2A will be used as DCI formats for data assignment which depend on a downlink transmission mode.

Embodiment 1

Figure 1:
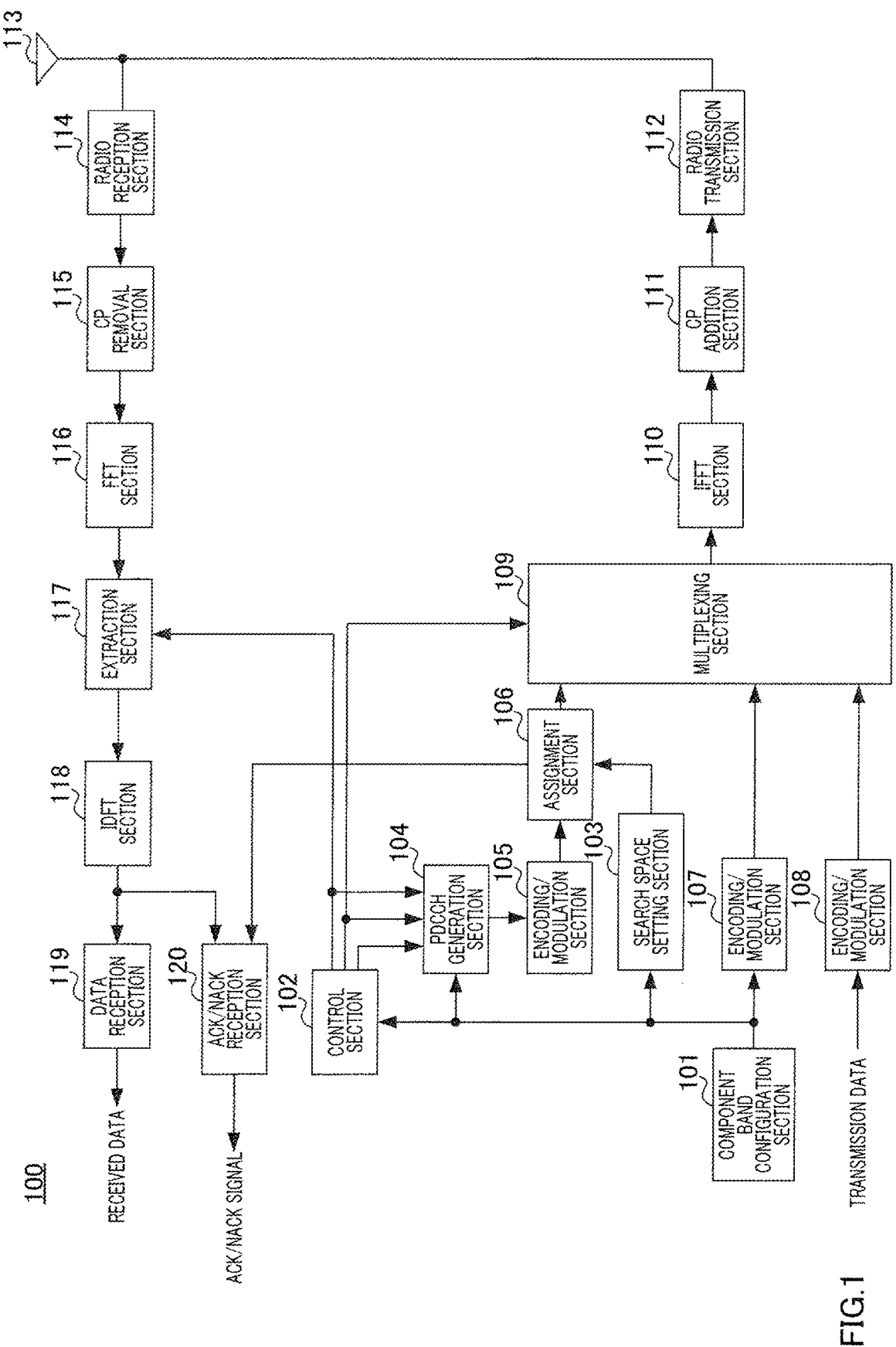
FIG. 1 is a block diagram showing a configuration of a base station according to Embodiment 1 of the present invention.

FIG. 1 is a block diagram showing the configuration of base station 100 according to this embodiment.

In base station 100 shown in FIG. 1, component band configuration section 101 sets (configures) one or a plurality of component bands used in an uplink and downlink respectively for each terminal, in accordance with a desired transmission rate or data transmission amount, for example. Here, component band configuration section 101 configures one component band for an LTE terminal, and configures one or a plurality of component bands for an LTE-A terminal. Also, component band configuration section 101 configures one component band among a plurality of component bands configured for an LTE-A terminal as an anchor band of that LTE-A terminal. Furthermore, component band configuration section 101 configures respective transmission modes (e.g., spatial multiplexing MIMO transmission, beam forming transmission, non-continuous band assignment or the like) in the uplink and downlink for each component band set in each terminal based on a channel situation or the like of each terminal. Then, component band configuration section 101 outputs configuration information including information on the component bands, anchor band and transmission modes configured for each terminal to control section 102, search space setting section 103, PDCCH generation section 104, and encoding/modulation section 107. The information included in the configuration information is reported to each terminal via encoding/modulation section 107 as upper-layer control information (RRC control information). Furthermore, as the anchor band, for example, a component band having a good long-time average channel situation (e.g., component band with little channel attenuation (path loss)), a component band with a high SIR, a component band with higher transmission power or receiving power or a component band with less interference from other cells is selected.

Control section 102 generates assignment control information according to the number of component bands shown in the configuration information input from component band configuration section 101. For example, for a terminal for which only one component band has been configured, control section 102 generates assignment control information including MCS information corresponding to one transport block, resource (RB) assignment information, and HARQ information. On the other hand, for a terminal for which a plurality of component bands have been configured, control section 102 generates assignment control information for each of the plurality of component bands. Here, as resource assignment information, control section 102 generates uplink resource assignment information indicating an uplink resource (for example, a PUSCH (Physical Uplink Shared Channel)) to which terminal uplink data is assigned, and downlink resource assignment information indicating a downlink resource (for example, a PDSCH (Physical Downlink Shared Channel)) to which downlink data addressed to a terminal is assigned.

Here, control section 102 generates assignment control information (DCI 0A, 0B) corresponding to the uplink transmission mode of a terminal, assignment control information (DCI 1, 2 or 2A) corresponding to the downlink transmission mode or assignment control information (DCI 0/1A) common to all terminals for each terminal and for each component band based on the configuration information input from component band configuration section 101.

For example, during normal data transmission, control section 102 generates assignment control information (DCI 1, 2, 2A, 0A, 0B) corresponding to a transmission mode of each component band of each terminal so as to be able to perform data transmission in a transmission mode set in each terminal to improve throughput. However, depending on a drastic variation in the channel situation or a variation in interference from a neighboring cell or the like, there can be a situation in which reception errors occur with a high frequency in the transmission mode set for each terminal. In this case, control section 102 generates assignment control information common to all terminals (DCI 0/1A), that is, assignment control information in a default transmission mode, and can thereby realize robuster transmission.

Furthermore, when the channel situation deteriorates, control section 102 also generates assignment control information common to all terminals (DCI 0/1A) during transmission of control information (RRC signaling) of an upper layer to report a change of the transmission mode. Here, the number of information bits of DCI 0/1A common to all terminals is smaller than the number of information bits of DCI 1, 2, 2A 0A, 0B in dependence on the transmission mode. For this reason, when the same number of CCEs is set, DCI 0/1A can transmit data at a lower coding rate than DCI 1, 2, 2A 0A, 0B. Therefore, when the channel situation deteriorates, control section 102 uses DCI 0/1A, and even a terminal in a poor channel situation can thereby receive data at a high error rate.

Furthermore, control section 102 generates assignment control information for shared channels (e.g., DCI 1C, 1A) for data assignment common to a plurality of terminals such as broadcast information and paging information in addition to assignment control information for terminal-specific data assignment.

Then, control section 102 outputs MCS information and HARQ information out of the generated assignment control information for terminal-specific data assignment to PDCCH generation section 104, outputs uplink resource assignment information to PDCCH generation section 104 and extraction section 117, and outputs downlink resource assignment information to PDCCH generation section 104 and multiplexing section 109. Furthermore, control section 102 outputs the generated assignment control information for shared channels to PDCCH generation section 104.

Figure 2:
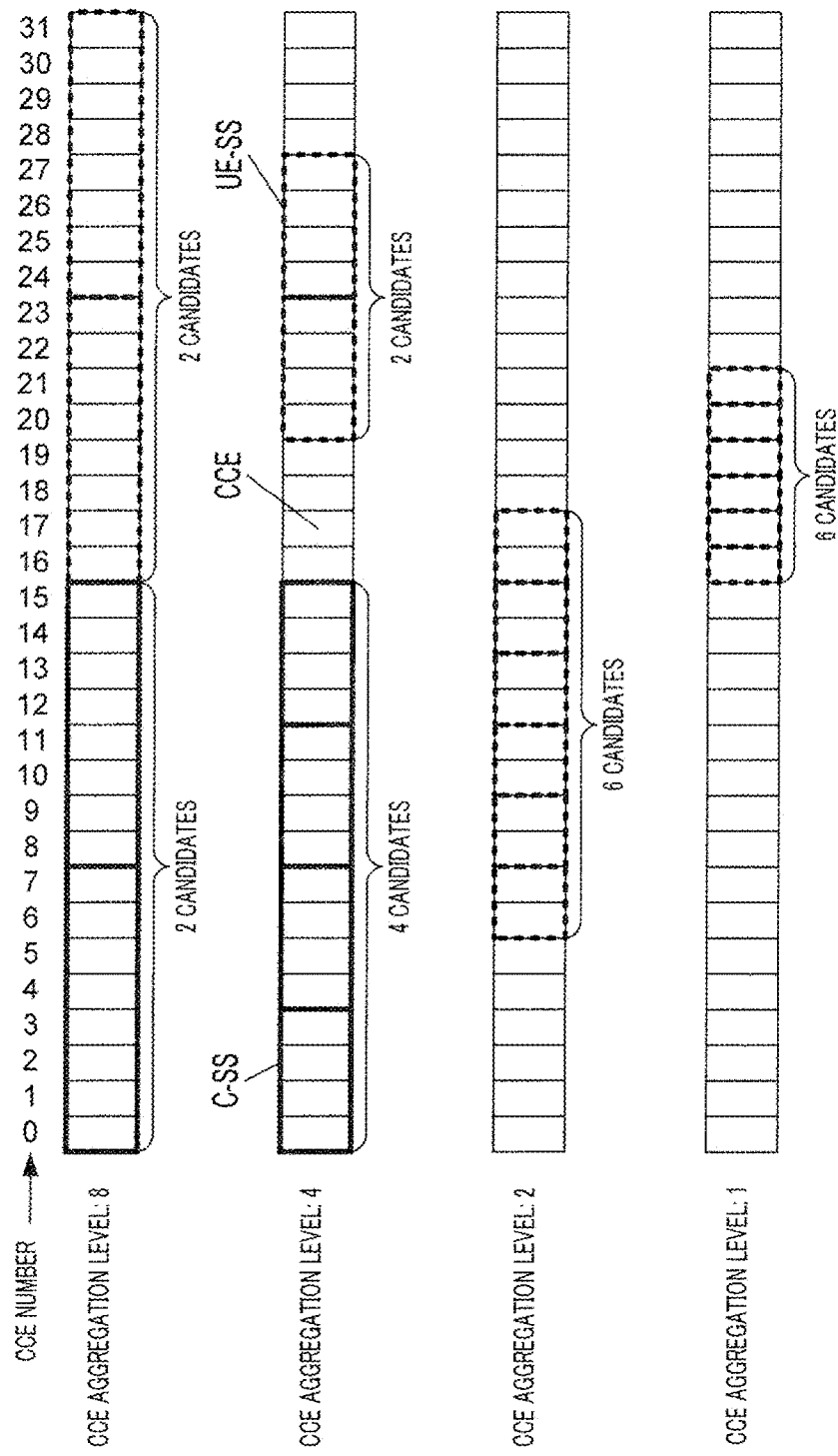
FIG. 2 is a diagram illustrating an example of setting a search space according to Embodiment 1 of the present invention.

Search space setting section 103 sets a common search space (C-SS) which is a search space common to all terminals and a specific search space (UE-SS) which is a search space specific to each terminal. Specifically, search space setting section 103 sets CCEs set beforehand in each component band (e.g., 16 CCEs from the first CCE) as a C-SS. Here, as assignment candidates within a C-SS made up of 16 CCEs, there are four candidates for a PDCCH having four CCEs and two candidates for a PDCCH having eight CCEs, a total of six candidates. Furthermore, search space setting section 103 sets a UE-SS for each component band set in each terminal based on information on a component band set in each terminal indicated by the configuration information input from component band configuration section 101. For example, search space setting section 103 calculates a UE-SS in a component band set in a certain terminal from CCE numbers calculated using a terminal ID of the terminal and a hash function for executing randomization, and the number of CCEs (L) making up a search space. A setting example of a C-SS and UE-SS corresponding to a certain terminal is shown in FIG. 2. In FIG. 2, search space setting section 103 sets four candidates (CCE0 to 3, CCE4 to 7, CCE8 to 11, CCE12 to 15) for CCE aggregation level 4 and two candidates (CCE0 to 7, CCE8 to 15) for CCE aggregation level 8, a total of six candidates as a C-SS. Furthermore, as shown in FIG. 2, search space setting section 103 sets six candidates (CCE16 to 21) for CCE aggregation level 1, six candidates (CCE6 to 17) for CCE aggregation level 2, two candidates (CCE20 to 23, CCE24 to 27) for CCE aggregation level 4 and two candidates (CCE16 to 23, CCE24 to 31) for CCE aggregation level 8, a total of 16 candidates as a UE-SS. Search space setting section 103 sets a UE-SS for each set component band for an LTE-A terminal for which a plurality of component bands are set. Search space setting section 103 then outputs search space information indicating set UE-SSs of each terminal to assignment section 106.

PDCCH generation section 104 generates a PDCCH signal including assignment control information for terminal-specific data assignment such as uplink resource assignment information, downlink resource assignment information, MCS information, and HARQ information input from control section 102 or a PDCCH signal including assignment control information for shared channels such as broadcast information common to terminals and paging information. At this time, PDCCH generation section 104 adds CRC bits to uplink resource assignment information and downlink resource assignment information, and also masks (or scrambles) CRC bits with a terminal ID in generating a PDCCH signal. Then, PDCCH generation section 104 outputs a masked PDCCH signal to encoding/modulation section 105.

Encoding/modulation section 105 modulates a PDCCH signal input from PDCCH generation section 104 after channel encoding, and outputs a modulated PDCCH signal to assignment section 106. Here, encoding/modulation section 105 sets a coding rate so that adequate reception quality is obtained by each terminal, based on channel quality information (a CQI: Channel Quality Indicator) notified from each terminal. For example, the nearer the location of a terminal to a cell boundary (the poorer the channel quality of a terminal), the lower is the coding rate set by encoding/modulation section 105.

Assignment section 106 assigns a PDCCH signal including assignment control information for shared channels input from encoding/modulation section 105 and a PDCCH signal including assignment control information for terminal-specific data assignment for each terminal to CCEs within a C-SS indicated by search space information input from search space setting section 103 or CCEs within a UE-SS for each terminal respectively. Here, the CCE aggregation level of one PDCCH signal differs according to the coding rate and the number of bits (amount of assignment control information) of the PDCCH signal. For example, since the coding rate of a PDCCH signal addressed to a terminal located in the vicinity of a cell boundary is set low, and more physical resources are necessary, assignment section 106 assigns a PDCCH signal addressed to a terminal located in the vicinity of a cell boundary to a greater number of CCEs.

For example, assignment section 106 selects one assignment candidate from among assignment candidates within a C-SS (e.g., FIG. 2). Assignment section 106 then assigns a PDCCH signal including assignment control information for shared channels to CCEs within the selected candidate.

Furthermore, for a terminal for which only one component band is configured, assignment section 106 assigns a PDCCH signal to CCEs within the UE-SS set in the terminal within the configured component band when assignment control information for terminal-specific data assignment included in the PDCCH signal addressed to the terminal is a transmission-mode-dependent DCI format (e.g., DCI 1, 2, 2A 0A, 0B). On the other hand, when assignment control information for terminal-specific data assignment included in the PDCCH signal addressed to the terminal is a format common to all terminals (e.g., DCI 0/1A), assignment section 106 assigns the PDCCH signal to CCEs within a C-SS of the configured component band or CCEs within a UE-SS configured for the terminal.

Furthermore, for a terminal for which a plurality of component bands are set, assignment section 106 assigns the PDCCH signal to CCEs within the UE-SS set in the terminal in each component band when the assignment control information for terminal-specific data assignment included in the PDCCH signal addressed to the terminal is a transmission-mode-dependent DCI format (e.g., DCI 1, 2, 2A, 0A, 0B). In this case, assignment section 106 assigns assignment control information to CCEs within the component band in which data subject to resource assignment indicated by the assignment control information is transmitted. On the other hand, when assignment control information for terminal-specific data assignment included in the PDCCH signal addressed to the terminal is a format common to all terminals (e.g., DCI 0/1A), assignment section 106 assigns the PDCCH signal only to CCEs within a C-SS set in an anchor band (specific component band) among a plurality of component bands configured for the terminal or CCEs within a UE-SS set in the terminal in an anchor band (specific component band).

Then assignment section 106 outputs a PDCCH signal assigned to a CCE to multiplexing section 109. Also, assignment section 106 outputs information indicating a CCE to which a PDCCH signal has been assigned to ACK/NACK reception section 120. Details of CCE assignment processing performed by assignment section 106 will be given later herein.

Encoding/modulation section 107 modulates configuration information input from component band configuration section 101 after channel encoding, and outputs modulated configuration information to multiplexing section 109.

Encoding/modulation section 108 modulates input transmission data (downlink data) after channel encoding, and outputs a modulated transmission data signal to multiplexing section 109.

Multiplexing section 109 multiplexes a PDCCH signal input from assignment section 106, configuration information input from encoding/modulation section 107, and a data signal (that is, a PDSCH signal) input from encoding/modulation section 108. Here, multiplexing section 109 maps a PDCCH signal and data signal (PDSCH signal) to each downlink component band based on downlink resource assignment information input from control section 102. Multiplexing section 109 may also map the configuration information to a PDSCH. Then, multiplexing section 109 outputs a multiplex signal to IFFT (Inverse Fast Fourier Transform) section 110.

IFFT section 110 converts a multiplex signal input from multiplexing section 109 to a time waveform, and CP (Cyclic Prefix) addition section 111 obtains an OFDM signal by adding a CP to this time waveform.

Radio transmission section 112 executes transmission radio processing (up-conversion, digital/analog (D/A) conversion, and so forth) on an OFDM signal input from CP addition section 111, and transmits the resulting signal via antenna 113.

On the other hand, radio reception section 114 executes radio reception processing (down-conversion, analog/digital (A/D) conversion, and so forth) on a received radio signal received in a reception band via antenna 113, and outputs the obtained received signal to CP removal section 115.

CP removal section 115 removes a CP from the received signal, and FFT (Fast Fourier Transform) section 116 converts the received signal without a CP to a frequency-domain signal.

Extraction section 117 extracts uplink data from a frequency-domain signal input from FFT section 116 based on uplink resource assignment information input from control section 102, and IDFT (Inverse Discrete Fourier Transform) section 118 converts an extracted signal to a time-domain signal, and outputs that time-domain signal to data reception section 119 and ACK/NACK reception section 120.

Data reception section 119 decodes a time-domain signal input from IDFT section 118. Then, data reception section 119 outputs decoded uplink data as received data.

Of the time-domain signal input from IDFT section 118, ACK/NACK reception section 120 extracts an ACK/NACK signal from each terminal correspond to downlink data (a PDSCH signal) from an uplink control channel (for example, a PUCCH (Physical Uplink Control Channel)) associated with a CCE used for assignment of that downlink data, based on information input from assignment section 106 and ACK/NACK reception section 120 performs ACK/NACK determination for an extracted ACK/NACK signal. Here, a CCE and PUCCH are associated in order to make efficient use of downlink channel communication resources by eliminating the need for signaling for notifying a PUCCH used by a terminal for ACK/NACK signal transmission from a base station to each terminal. Therefore, each terminal determines a PUCCH to use for transmission of an ACK/NACK signal from that terminal from a CCE to which control information (a PDCCH signal) to that terminal is mapped in accordance with this association. Here, when base station 100 assigns a PDCCH signal that includes downlink resource assignment information of downlink data (a PDSCH signal) of a plurality of component bands to a CCE of a downlink component band of a plurality of component bands, ACK/NACK reception section 120 extracts a plurality of ACK/NACK signals from a PUCCH associated with the CCE number of each CCE.

Figure 3:
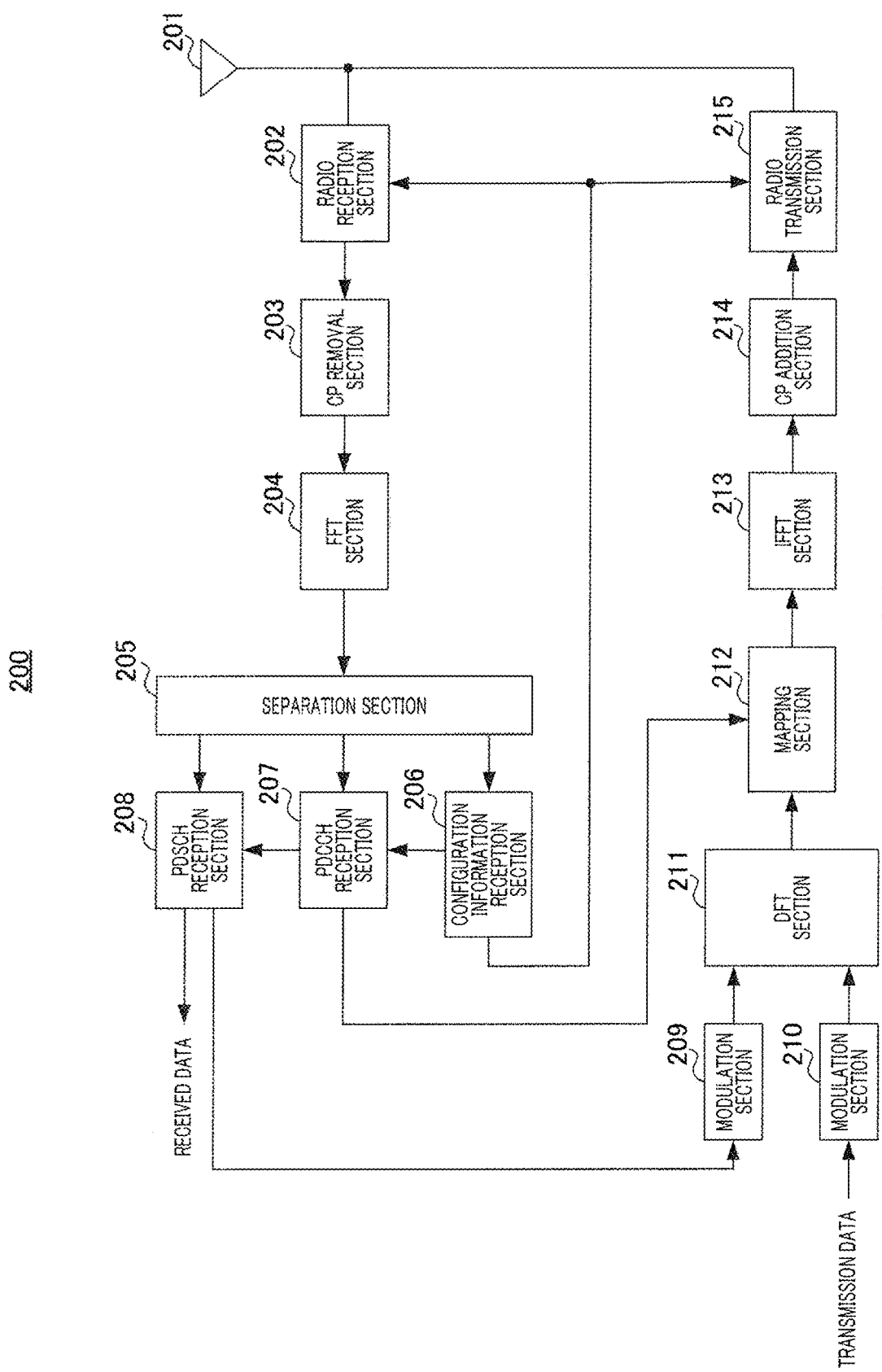
FIG. 3 is a block diagram showing a configuration of a terminal according to Embodiment 1 of the present invention.

FIG. 3 is a block diagram showing the configuration of terminal 200 according to this embodiment. Terminal 200 is an LTE-A terminal, and receives a data signal (downlink data) using a plurality of downlink component bands, and transmits an ACK/NACK signal for that data signal to base station 100 using a PUCCH of one uplink component band.

In terminal 200 shown in FIG. 3, radio reception section 202 is configured so as to enable a change of reception band, and changes a reception band based on band information input from configuration information reception section 206. Then the radio reception section 202 executes radio reception processing (down-conversion, analog/digital (A/D) conversion, and so forth) on a received radio signal (here, an OFDM signal) received in a reception band via antenna 201, and outputs the obtained received signal to CP removal section 203. The received signal includes control information of an upper layer including a PDSCH signal, PDCCH signal and configuration information. Furthermore, the PDCCH signal (assignment control information) is assigned to a common search space (C-SS) set in terminal 200 and other terminals for each component band or specific search space (UE-SS) in terminal 200 for each component band.

CP removal section 203 removes a CP from the received signal, and FFT section 204 converts the received signal without a CP to a frequency-domain signal. This frequency-domain signal is output to separation section 205.

Separation section 205 separates a signal input from FFT section 204 into an upper-layer control signal that includes configuration information (for example, RRC signaling or the like), a PDCCH signal, and a data signal (that is, a PDSCH signal). Then, separation section 205 outputs a control signal to configuration information reception section 206, outputs a PDCCH signal to PDCCH reception section 207, and outputs a PDSCH signal to PDSCH reception section 208.

Configuration information reception section 206 reads information indicating an uplink component band and downlink component band configured for this terminal from a control signal input from separation section 205, and outputs the read information to PDCCH reception section 207, the radio reception section 202, and a radio transmission section 215 as band information. Also, configuration information reception section 206 reads information indicating a terminal ID set for this terminal from a control signal input from separation section 205, and outputs the read information to PDCCH reception section 207 as terminal ID information. Furthermore, configuration information reception section 206 reads information indicating an anchor band configured for this terminal, and outputs the read information to PDCCH reception section 207 as anchor band information. Furthermore, configuration information reception section 206 reads information indicating a transmission mode configured for this terminal, and outputs the read information to PDCCH reception section 207 as transmission mode information.

PDCCH reception section 207 performs blind decoding (monitoring) of a PDCCH signal input from separation section 205, and obtains a PDCCH signal addressed to this terminal. Here, PDCCH reception section 207 performs blind decoding on a DCI format for data assignment common to all terminals (e.g., DCI 0/1A), a transmission-mode-dependent DCI format (e.g., DCI 1, 2, 2A 0A, 0B) configured for this terminal and a DCI format for shared channel assignment common to all terminals (e.g., DCI 1C, 1A), and thereby obtains a PDCCH signal including assignment control information in each DCI format.

Specifically, PDCCH reception section 207 performs blind decoding of a DCI format for shared channel assignment (DCI 1C, 1A) and a DCI format for data assignment common to all terminals (DCI 0/1A) for a C-SS of an anchor band indicated in anchor band information input from configuration information reception section 206. That is, PDCCH reception section 207 demodulates and decodes CCE candidates of each CCE aggregation level within a C-SS focused on the size of a DCI format for shared channel assignment and the size of a DCI format for data assignment common to all terminals. PDCCH reception section 207 demasks the CRC bit with an ID common to a plurality of terminals for the decoded PDCCH signal, and thereby determines that a PDCCH signal resulting in CRC=OK (no error) is a PDCCH signal including assignment control information for shared channels. Furthermore, PDCCH reception section 207 demasks the CRC bit with the terminal ID of this terminal indicated by terminal ID information for the decoded PDCCH signal, and thereby determines that a PDCCH signal resulting in CRC=OK (no error) is a PDCCH signal including assignment control information for data assignment common to all terminals. That is, PDCCH reception section 207 distinguishes whether the assignment control information of DCI 0/1A in a C-SS is for shared channels or for data assignment, with a terminal ID (common ID for a plurality of terminals or terminal ID of terminal 200).

Furthermore, when the number of downlink component bands indicated by band information input from configuration information reception section 206 is one, PDCCH reception section 207 calculates a UE-SS of this terminal for each CCE aggregation level using the terminal ID of this terminal indicated by the terminal ID information input from configuration information reception section 206. PDCCH reception section 207 then demodulates and decodes CCE candidates of each calculated CCE aggregation level in a UE-SS focused on the size of a DCI format corresponding to a transmission mode (transmission mode indicated in transmission mode information) set in this terminal and the size of a DCI format common to all terminals (DCI 0/1A). PDCCH reception section 207 demasks the CRC bit with the terminal ID of this terminal for the decoded PDCCH signal, and thereby determines that the PDCCH signal resulting in CRC=OK (no error) is a PDCCH signal addressed to this terminal.

On the other hand, when the number of downlink component bands indicated by the band information input from configuration information reception section 206 is plural, PDCCH reception section 207 calculates a UE-SS of this terminal for each CCE aggregation level using the terminal ID of this terminal indicated by terminal ID information input from configuration information reception section 206 in each configured component band. PDCCH reception section 207 demodulates and decodes CCE candidates at each calculated CCE aggregation level within a UE-SS focused on the size of a DCI format corresponding to a transmission mode set in this terminal and the size of a DCI format common to all terminals (DCI 0/1A) in an anchor band indicated by anchor band information. Furthermore, PDCCH reception section 207 demodulates and decodes CCE candidates at each calculated CCE aggregation level within a UE-SS focused on only the size of a DCI format corresponding to the transmission mode set in the terminal in component bands other than the anchor band among a plurality of component bands configured for this terminal.

That is, PDCCH reception section 207 performs blind decoding only on CCEs within a C-SS set in an anchor band (specific component band) among a plurality of component bands configured for this terminal and CCEs within a UE-SS set in this terminal in the anchor band (specific component band). PDCCH reception section 207 then demasks the CRC bit with the terminal ID of this terminal for the decoded PDCCH signal, and thereby determines that the PDCCH signal resulting in CRC=OK (no error) as a PDCCH signal addressed to this terminal.

PDCCH reception section 207 then outputs the downlink resource assignment information included in the PDCCH signal addressed to this terminal to PDSCH reception section 208 and outputs the uplink resource assignment information to mapping section 212. Furthermore, PDCCH reception section 207 outputs a CCE number of a CCE from which a PDCCH signal addressed to this terminal is detected (a CCE resulting in CRC=OK) (CCE number of the first CCE when the CCE aggregation level is plural) to mapping section 212. Details of the blind decoding (monitoring) processing by PDCCH reception section 207 will be described later.

PDSCH reception section 208 extracts received data (downlink data) from a PDSCH signal input from separation section 205 based on the downlink resource assignment information input from PDCCH reception section 207. Also, PDSCH reception section 208 performs error detection on the extracted received data (downlink data). Then, PDSCH reception section 208 generates a NACK signal as an ACK/NACK signal if the result of error detection is that there is an error in the received data, or generates an ACK signal as an ACK/NACK signal if the result of error detection is that there is no error in the received data, and outputs an ACK/NACK signal to modulation section 209.

Modulation section 209 modulates an ACK/NACK signal input from PDSCH reception section 208, and outputs a modulated ACK/NACK signal to DFT (Discrete Fourier transform) section 211.

Modulation section 210 modulates transmission data (uplink data), and outputs a modulated data signal to DFT section 211.

DFT section 211 converts an ACK/NACK signal input from modulation section 209 and a data signal input from modulation section 210 to the frequency domain, and outputs an obtained plurality of frequency components to mapping section 212.

Mapping section 212 maps a frequency component corresponding to a data signal, from among a plurality of frequency components input from DFT section 211, to a PUSCH placed in an uplink component band, in accordance with uplink resource assignment information input from PDCCH reception section 207. Also, mapping section 212 maps a frequency component or code resource corresponding to an ACK/NACK signal, from among a plurality of frequency components input from DFT section 211, to a PUCCH placed in an uplink component band, in accordance with a CCE number input from PDCCH reception section 207.

Modulation section 209, modulation section 210, DFT section 211, and mapping section 212 may also be provided for each component band.

IFFT section 213 converts a plurality of frequency components mapped to a PUSCH to a time-domain waveform, and CP addition section 214 adds a CP to that time-domain waveform.

Radio transmission section 215 is configured so as to enable a change of transmission band, and sets a transmission band based on band information input from configuration information reception section 206. Then, the radio transmission section 215 executes transmission radio processing (up-conversion, digital/analog (D/A) conversion, and so forth) on a signal with a CP, and transmits the resulting signal via antenna 201.

A detailed description will now be given of PDCCH signal assignment processing performed by assignment section 106 of base station 100, and blind decoding (monitoring) processing performed by PDCCH reception section 207 of terminal 200.

Figure 4:
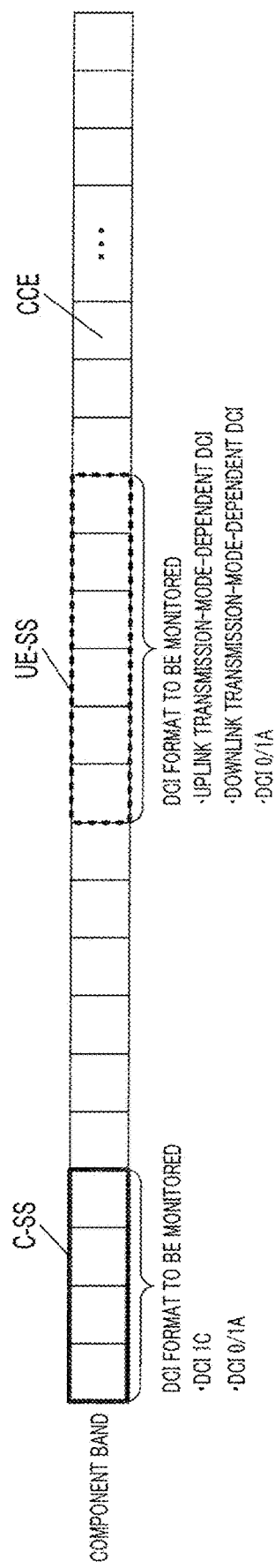
FIG. 4 is a diagram illustrating CCE assignment processing and blind decoding (monitoring) processing according to Embodiment 1 of the present invention (when one component band is set in the terminal)
Figure 5:
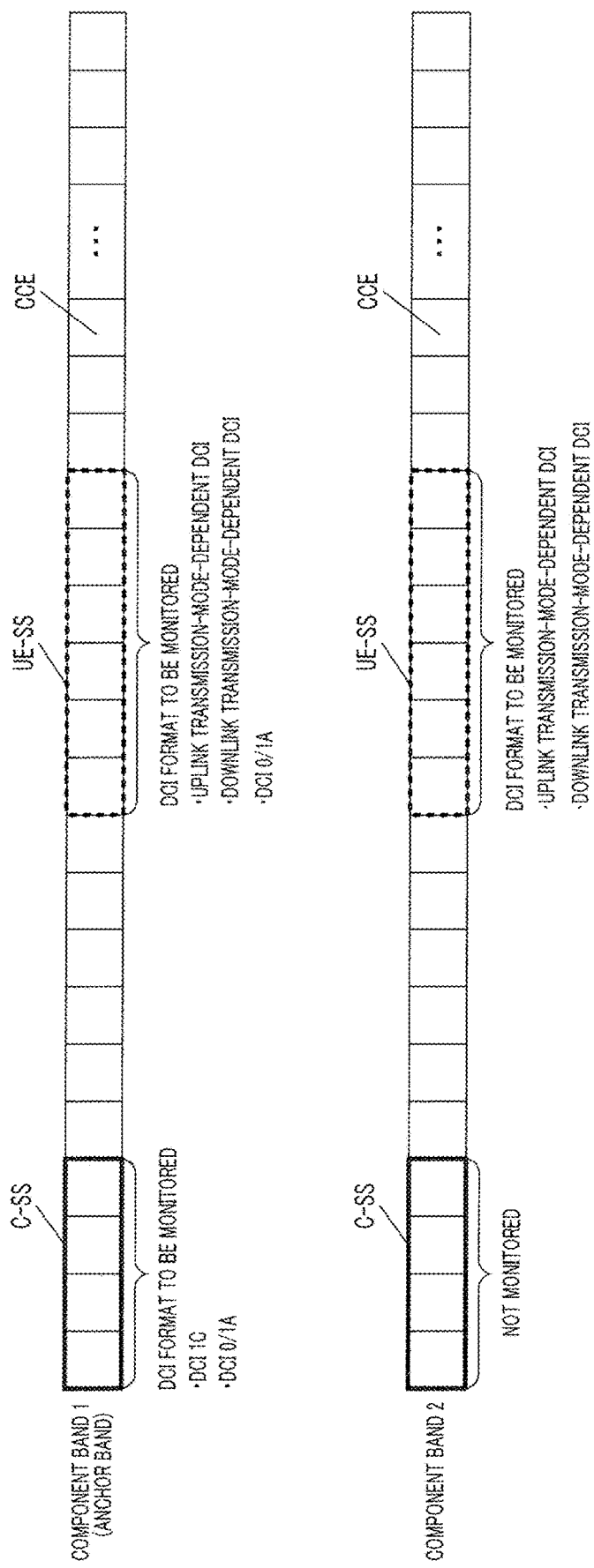
FIG. 5 is a diagram illustrating CCE assignment processing and blind decoding (monitoring) processing according to Embodiment 1 of the present invention (when a plurality of component bands are set in the terminal)

In the following description, component band configuration section 101 (FIG. 1) of base station 100 configures one downlink component band for terminal 200 (LTE-A terminal) as shown in FIG. 4 and configures a plurality of downlink component bands (component bands 1, 2, . . . ) as shown in FIG. 5. Also, component band configuration section 101 configures component band 1 as an anchor band of terminal 200.

In the following description, a PDCCH placed in each downlink component band is constructed of a plurality of CCEs as shown in FIG. 4 and FIG. 5. Furthermore, in FIG. 4 and FIG. 5, base station 100 assumes that the number of CCEs making up a C-SS set in each component band is four and the number of CCEs making up a UE-SS of each component band set in terminal 200 is six. That is, search space setting section 103 of base station 100 sets a C-SS made up of four CCEs in each component band and sets a UE-SS made up of six CCEs in each component band as shown in FIG. 4 and FIG. 5. Furthermore, as shown in FIG. 4 and FIG. 5, terminal 200 sets the C-SS according to information reported from base station 100 beforehand and also calculates the UE-SS of this terminal shown in FIG. 5 based on the terminal ID of this terminal.

First, a case will be described where the number of component bands configured for terminal 200 is one (FIG. 4).

In this case, assignment section 106 of base station 100 assigns a PDCCH signal including assignment control information for shared channels (DCI 1C, 1A) to CCEs in the C-SS shown in FIG. 4. Alternatively, assignment section 106 assigns a PDCCH signal including assignment control information for data assignment common to all terminals (DCI 0/1A) to CCEs in the C-SS or CCEs in the UE-SS shown in FIG. 4. Alternatively, assignment section 106 assigns transmission-mode-dependent assignment control information set in terminal 200 (uplink (DCI 0A, 0B), downlink (DCI 1, 2, 2A)) to CCEs in the UE-SS shown in FIG. 4.

On the other hand, PDCCH reception section 207 of terminal 200 performs blind decoding on a PDCCH signal including assignment control information for shared channels (DCI 1C, 1A) and a PDCCH signal including assignment control information for data assignment common to all terminals (DCI 0/1A) or the C-SS shown in FIG. 4. Furthermore, PDCCH reception section 207 performs blind decoding on a PDCCH signal including transmission-mode-dependent assignment control information (uplink (assignment control information in which any one of DCIs 0A and 0B is set), downlink (assignment control information in which any one of DCI 1, 2 and 2A is set) and a PDCCH signal including assignment control information for data assignment common to all terminals (DCI 0/1A) for the UE-SS shown in FIG. 4.

That is, terminal 200 performs blind decoding on two types of DCI format (DCI 1C and DCI 0/1A) for the C-SS and performs blind decoding on three types of DCI format (uplink transmission-mode-dependent DCI (DCI of any one of DCIs 0A and 0B) and downlink transmission-mode-dependent DCI (DCI of any one of DCI 1, 2 and 2A) and DCI 0/1A)) for the UE-SS in the component bands shown in FIG. 4☐ For example, a case will be described where blind decoding is performed six times for each DCI format for the C-SS and blind decoding is performed 16 times for each DCI format for the UE-SS as shown in FIG. 2. In this case, PDCCH reception section 207 of terminal 200 performs blind decoding a total of 60 (=(6×2)+(16×3)) times in the component band shown in FIG. 4.

Next, a case will be described where a plurality of component bands are configured for terminal 200 (FIG. 5).

In this case, assignment section 106 of base station 100 assigns a PDCCH signal including assignment control information for shared channels (DCI 1C, 1A) to CCEs within a C-SS of component band 1 (anchor band) shown in FIG. 5. Alternatively, assignment section 106 assigns a PDCCH signal including assignment control information for data assignment common to all terminals (DCI 0/1A) to CCEs in a C-SS of component band 1 (anchor band) shown in FIG. 5 or CCEs in a UE-SS of component band 1 (anchor band). Furthermore, assignment section 106 assigns transmission-mode-dependent assignment control information set in terminal 200 (uplink (DCI 0A, 0B), downlink (DCI 1, 2, 2A)) to CCEs in each UE-SS of a plurality of component bands (component bands 1, 2, . . . ) shown in FIG. 5. For example, assignment section 106 assigns a PDCCH signal including assignment control information indicating resource assignment information for data transmitted in component band n shown in FIG. 5 to CCEs in a UE-SS of component band n.

That is, when a plurality of component bands are set in terminal 200, base station 100 transmits a PDCCH signal including assignment control information for data assignment common to all terminals (DCI 0/1A) only using a C-SS or UE-SS in the anchor band (component band 1 in FIG. 5) of terminal 200. Furthermore, base station 100 transmits a PDCCH signal including assignment control information for shared channels (DCI 1C, 1A) only using a C-SS in the anchor band (component band 1 in FIG. 5) of terminal 200. In other words, base station 100 transmits only transmission-mode-dependent assignment control information (DCI 1, 2, 2A 0A, 0B) in component bands (component bands from component band 2 onward in FIG. 5) other than the anchor band of terminal 200 (component band 1 in FIG. 5).

On the other hand, PDCCH reception section 207 of terminal 200 performs blind decoding on a PDCCH signal including assignment control information for shared channels (DCI 1C, 1A) and a PDCCH signal including assignment control information for data assignment common to all terminals (DCI 0/1A) for the C-SS of component band 1 (anchor band) shown in FIG. 5. Furthermore, PDCCH reception section 207 performs blind decoding on a PDCCH signal including transmission-mode-dependent assignment control information (uplink (DCI 0A, 0B), downlink (DCI 1, 2, 2A)) and a PDCCH signal including assignment control information for data assignment common to all terminals (DCI 0/1A) for the UE-SS of component band 1 (anchor band) shown in FIG. 5. Furthermore, PDCCH reception section 207 performs blind decoding on a PDCCH signal including transmission-mode-dependent assignment control information (uplink (DCI 0A, 0B), downlink (DCI 1, 2, 2A)) for UE-SSs of component bands from component band 2 onward shown in FIG. 5 (that is, component bands other than the anchor band among a plurality of component bands configured for terminal 200).

That is, PDCCH reception section 207 performs blind decoding (monitoring) on neither a PDCCH signal including assignment control information for shared channels in component bands from component band 2 onward shown in FIG. 5 (component bands other than the anchor band) (DCI 1C, 1A) nor a PDCCH signal including assignment control information for data assignment common to all terminals (DCI 0/1A). That is, PDCCH reception section 207 performs blind decoding (monitoring) in both a C-SS and UE-SS in component band 1 (anchor band) shown in FIG. 5, whereas in component bands from component band 2 onward (component bands other than component band 1), PDCCH reception section 207 performs blind decoding (monitoring) not in a C-SS but only in a UE-SS.

Specifically, terminal 200 has two types of DCI formats (DCI 1C and DCI 0/1A) subject to blind decoding (monitoring) in a C-SS of component band 1 (anchor band) shown in FIG. 5. On the other hand, there are three types of DCI formats subject to blind decoding (monitoring) in a UE-SS of component band 1 shown in FIG. 5 (uplink transmission-mode-dependent DCI (DCI 0A, 0B) and downlink transmission-mode-dependent DCI (DCI 1, 2, 2A) and DCI 0/1A). On the other hand, there is no DCI format subject to blind decoding (monitoring) in C-SSs of component bands from component band 2 onward shown in FIG. 5. Furthermore, there are two types of DCI formats subject to blind decoding (monitoring) in UE-SSs of component bands from component band 2 onward shown in FIG. 5 (uplink transmission-mode-dependent DCI (DCI 0A, 0B) and downlink transmission-mode-dependent DCI (DCI 1, 2, 2A)).

Regarding the reduction of a blind decoding count, a case will be described where as shown, for example, in FIG. 2, blind decoding is performed six times for each DCI format in a C-SS and blind decoding is performed 16 times for each DCI format in a UE-SS. In this case, PDCCH reception section 207 performs blind decoding a total of 60 (=(6×2)+(16×3)) times in component band 1 (anchor band) and a total of 32 (=16×2) times per component band in component bands from component band 2 onward. That is, in each component band from component band 2 onward shown in FIG. 5, it is possible to reduce the blind decoding count (a total of 28 times) by a blind decoding count (12 (=6×2) times) corresponding to two types of DCI format (DCI 1C, 0/1A) in a C-SS and by a blind decoding count (16 times) corresponding to one type of DCI format (DCI 0/1A) in a UE-SS.

For example, when five component bands are configured for terminal 200, terminal 200 needs to perform blind decoding a total of 300 times (60 times×5) as described above when performing blind decoding on the five types of DCI format in all component bands. By contrast, the present embodiment needs to perform blind decoding a total of 188 times (=(60 times×1)+(32 times×4)). That is, the present embodiment reduces the blind decoding count by 112 times (=28 times×4).

Thus, for terminal 200 for which a plurality of component bands are configured, base station 100 assigns assignment control information common to all terminals (DCI 0/1A) only to a C-SS or UE-SS set in the anchor band (component band 1 in FIG. 5) among the plurality of component bands. Thus, terminal 200 needs to perform blind decoding (monitoring) on assignment control information common to all terminals (DCI 0/1A) in only a C-SS and UE-SS set in the anchor band (component band 1 in FIG. 5) among the plurality of component bands configured for this terminal. That is, terminal 200 does not need to perform blind decoding (monitoring) on assignment control information common to all terminals (DCI 0/1A) in component bands other than the anchor band configured for this terminal, and can thereby reduce the blind decoding count in terminal 200.

Similarly, base station 100 assigns assignment control information for shared channels (DCI 1C, 1A) of a plurality of component bands configured for terminal 200 only to a C-SS of the anchor band (component band 1 in FIG. 5) configured for terminal 200. Thus, terminal 200 needs only to perform blind decoding (monitoring) on assignment control information for shared channels (DCI 1C, 1A) in only a C-SS of the anchor band (component band 1 in FIG. 5) configured for this terminal. That is, terminal 200 does not need to perform blind decoding (monitoring) on assignment control information for shared channels (DCI 1C, 1A) in component bands other than the anchor band configured for this terminal, and can thereby reduce the blind decoding count in terminal 200.

Here, DCI 0/1A is mainly used, when the channel situation drastically changes, to report the change or the like in the transmission mode. That is, DCI 0/1A is used, when the channel situation changes for the worse and can no longer communicate in the current transmission mode, to assign control information of an upper layer to which the change to a transmission mode in which communication can be performed even in that poor channel situation (that is, an emergency-evacuation-like transmission mode) is reported. Such control information may be transmitted in any one of a plurality of less frequently used component bands configured for the terminal. Therefore, even when base station 100 assigns assignment control information of DCI 0/1A only to the anchor band, the possibility of the assignment control information of DCI 0/1A being simultaneously transmitted is low and the probability of the CCE block rate increasing due to contention of CCEs with other terminals is low.

Furthermore, base station 100 may configure a component band having a good channel situation (e.g., component band having low channel attenuation (path loss) or component band having a small amount of interference from other cells) in the anchor band. This allows base station 100 to transmit a PDCCH signal including assignment control information of DCI 0/1A and data subject to resource assignment indicated by the assignment control information (e.g., control information of an upper layer to which a change to an emergency-evacuation-like transmission mode is reported) in a component band having a good channel situation, allowing robuster transmission. That is, base station 100 configures a component band having a good channel situation in the anchor band, and can thereby realize highly efficient transmission by reducing the error rate of the PDCCH signal and data, and transmitting the signal and data at a high coding rate.

Thus, according to the present embodiment, for terminals for which a plurality of component bands are configured, the base station assigns assignment control information of DCI 0/1A only to the anchor band configured for each terminal. Thus, the terminal needs only to perform blind decoding on DCI 0/1A in only the anchor band. This eliminates the need for the terminal to perform blind decoding on DCI 0/1A in component bands other than the anchor band among a plurality of component bands configured for this terminal. Furthermore, the assignment control information reported using DCI 0/1A (e.g., control information of an upper layer) is less frequently used than the transmission-mode-dependent DCI format and may be assigned to any one component band. Therefore, even when the search space to which assignment control information reported using DCI 0/1A is assigned is limited, the probability of the CCE block rate increasing due to contention of CCEs with other terminals is low. Therefore, even when a plurality of component bands are configured for the terminal, the present embodiment can reduce the blind decoding count of the terminal without increasing the CCE block rate.

Embodiment 2

The present embodiment differs from Embodiment 1 in that indication information for indicating a component band subject to resource assignment is added to assignment control information assigned to a UE-SS of an anchor band of assignment control information of DCI 0/1A for a terminal for which a plurality of component bands are configured.

The present embodiment will now be explained in detail. Base station 100 (FIG. 1) and terminal 200 (FIG. 3) according to this embodiment have the same kind of configurations as in Embodiment 1, but the operation of control section 102, assignment section 106 and PDCCH reception section 207 differs.

Figure 6:
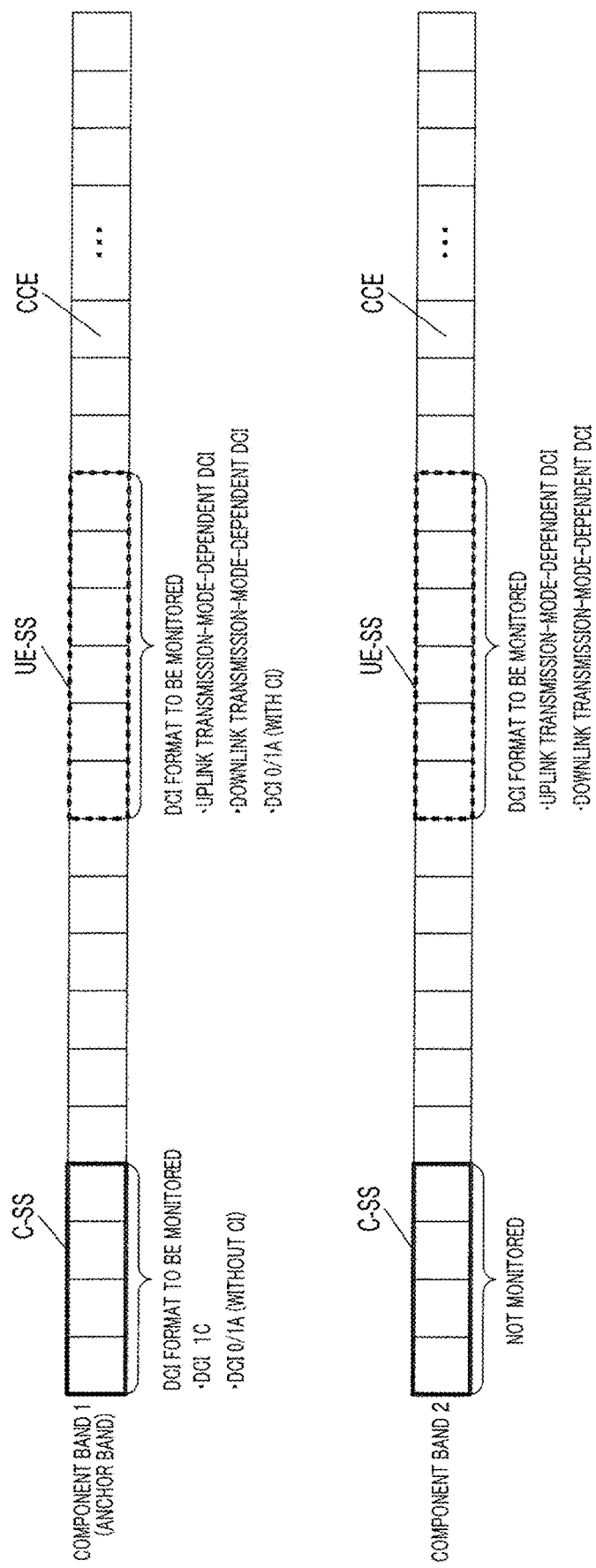
FIG. 6 is a diagram illustrating CCE assignment processing and blind decoding (monitoring) processing according to Embodiment 2 of the present invention.

Furthermore, in the following descriptions, as shown in FIG. 6, component band configuration section 101 (FIG. 1) of base station 100 configures a plurality of downlink component bands (component bands 1, 2, . . . ) for terminal 200 (LTE-A terminal) as in the case of Embodiment 1 (FIG. 5). Furthermore, as shown in FIG. 6, component band configuration section 101 configures component band 1 as an anchor band of terminal 200. Furthermore, in FIG. 6, base station 100 assumes that the number of CCEs making up a C-SS to be set in each component band is four and the number of CCEs making up a UE-SS of each component band to be set in terminal 200 is six as in the case of Embodiment 1 (FIG. 5).

When generating assignment control information of DCI 0/1A for a terminal for which a plurality of component bands are configured, control section 102 of base station 100 (FIG. 1) according to the present embodiment adds a component band indication bit (Carrier Indicator: CI) which is indication information that indicates a component band subject to assignment of resource assignment information indicated by assignment control information among the plurality of component bands.

Here, a PDCCH signal including assignment control information for shared channels (DCI 1A) is also received by an LTE terminal in addition to terminal 200 (LTE-A terminal). Therefore, when DCI 1A is used as assignment control information for shared channels, a CI cannot be added to the assignment control information. Furthermore, with assignment control information for terminal-specific data assignment (DCI 0/1A), the size of assignment control information with a CI is different from the size of assignment control information without a CI. That is, when base station 100 assigns assignment control information with a CI (for terminal-specific data assignment) and assignment control information without a CI (e.g., for shared channels) within the same C-SS, terminal 200 needs to perform blind decoding on DCI 0/1A focused on different sizes. Therefore, assigning assignment control information (DCI 0/1A) with a CI within a C-SS causes the blind decoding count to increase.

Thus, when assignment control information included in the PDCCH signal for a terminal for which a plurality of component bands are configured is a DCI format common to all terminals (DCI 0/1A) and a CI is added thereto, assignment section 106 assigns the PDCCH signal to CCEs within a UE-SS in the anchor band configured for the terminal. That is, when assignment control information included in the PDCCH signal is a DCI format common to all terminals (DCI 0/1A) and a CI is added thereto, assignment section 106 does not assign the PDCCH signal to CCEs within a C-SS. Specifically, assignment section 106 assigns a PDCCH signal including assignment control information with a CI (DCI 0/1A (with a CI)) among PDCCH signals including assignment control information for data assignment common to all terminals (DCI 0/1A) to CCEs within the UE-SS in component band 1 (anchor band) shown in FIG. 6. Furthermore, assignment section 106 assigns a PDCCH signal including assignment control information without a CI (DCI 0/1A (without a CI)) to CCEs within the C-SS in component band 1 (anchor band) shown in FIG. 6.

Furthermore, assignment section 106 assigns a PDCCH signal including assignment control information for shared channels (DCI 1C, 1A shown in FIG. 6) to CCEs within a C-SS of component band 1 (anchor band) as in the case of Embodiment 1. Furthermore, assignment section 106 assigns transmission-mode-dependent assignment control information (uplink (DCI 0A, 0B), downlink (DCI 1, 2, 2A)) configured for terminal 200 to CCEs in each UE-SS of a plurality of component bands (component bands 1, 2, . . . shown in FIG. 6) configured for terminal 200 as in the case of Embodiment 1.

On the other hand, PDCCH reception section 207 of terminal 200 (FIG. 3) demodulates and decodes CCE candidates at each CCE aggregation level within a UE-SS calculated in the anchor band of this terminal indicated by the anchor band information focused on the size of a DCI format corresponding to the transmission mode set in this terminal and focused on the size of a DCI format common to all terminals (DCI 0/1A). Specifically, PDCCH reception section 207 performs blind decoding on a PDCCH signal including assignment control information for shared channels (DCI 1C, 1A) and a PDCCH signal including assignment control information for data assignment common to all terminals (DCI 0/1A (without a CI)) for the C-SS of component band 1 (anchor band) shown in FIG. 6 as in the case of Embodiment 1. Furthermore, PDCCH reception section 207 performs blind decoding on a PDCCH signal including transmission-mode-dependent assignment control information (uplink (DCI 0A, 0B), downlink (DCI 1, 2, 2A)) for each UE-SS of a plurality of component bands (component bands 1, 2, . . . shown in FIG. 6) configured for this terminal as in the case of Embodiment 1.

Furthermore, PDCCH reception section 207 performs blind decoding on a PDCCH signal including assignment control information for data assignment common to all terminals (DCI 0/1A (with a CI)) for the UE-SS of component band 1 (anchor band) shown in FIG. 6. At this time, PDCCH reception section 207 performs blind decoding focused on the size of assignment control information with a CI. That is, PDCCH reception section 207 performs blind decoding on CCEs in the UE-SS of component band 1 shown in FIG. 6 and thereby obtains assignment control information with a CI.

Thus, assignment section 106 of base station 100 adds a CI to assignment control information and thereby assigns not only assignment control information (DCI 0/1A) indicating resource assignment information to be assigned to the anchor band (component band 1 in FIG. 6) configured for terminal 200 but also assignment control information (DCI 0/1A) indicating resource assignment information to be assigned to component bands other than the anchor band only to CCEs within a UE-SS of the anchor band. Upon acquiring assignment control information of DCI 0/1A addressed to this terminal in the UE-SS of component band 1 (anchor band) shown in FIG. 6, PDCCH reception section 207 of terminal 200 identifies the component band indicated by a CI added to the assignment control information as a component band subject to resource assignment.

Although base station 100 transmits assignment control information of DCI 0/1A for terminal-specific data assignment only in the anchor band (component band 1 in FIG. 6) configured for terminal 200, it is possible to perform data assignment to all of the plurality of component bands configured for terminal 200.

Thus, base station 100 can select a component band to transmit data such as control information of an upper layer reported using DCI 0/1A (e.g., control information reporting a change to an emergency-evacuation-like transmission mode) for every transmission timing (e.g., in subframe units), and therefore the degree of freedom of data assignment improves. For example, base station 100 follows an instantaneous variation in the channel situation in subframe units, and can thereby transmit data such as control information of an upper layer in a component band having a good channel situation. This makes it possible to realize data transmission at a high coding rate, that is, high efficiency data transmission with a small number of resources.

Furthermore, as in the case of Embodiment 1, assignment control information of DCI 0/1A is assigned only to component band 1 which is the anchor band shown in FIG. 6. For this reason, terminal 200 may designate only component band 1 which is the anchor band of this terminal as a blind decoding (monitoring) target for assignment control information of DCI 0/1A. It is thereby possible to reduce the blind decoding count of terminal 200 for which a plurality of component bands are configured as in the case of Embodiment 1.

Thus, the present embodiment adds a CI to assignment control information of DCI 0/1A assigned to a UE-SS, and can thereby reduce the blind decoding count of the terminal even when a plurality of component bands are configured for the terminal without increasing the CCE block rate as in the case of Embodiment 1 while improving the degree of freedom of data assignment.

Embodiment 3

In the present embodiment, a base station assigns assignment control information of DCI 0/1A only to CCEs within respective C-SSs set in a plurality of component bands for a terminal for which a plurality of component bands are configured.

Hereinafter, the present embodiment will be described more specifically. Base station 100 (FIG. 1) and terminal 200 (FIG. 3) according to the present embodiment have configurations similar to those in Embodiment 1, but differ in the operation of assignment section 106 and PDCCH reception section 207. Furthermore, the operation when the number of component bands configured for the terminal is one is similar to that in Embodiment 1 (FIG. 4), and therefore descriptions thereof will be omitted. That is, a case will be described below where a plurality of component bands are configured for the terminal.

Figure 7:
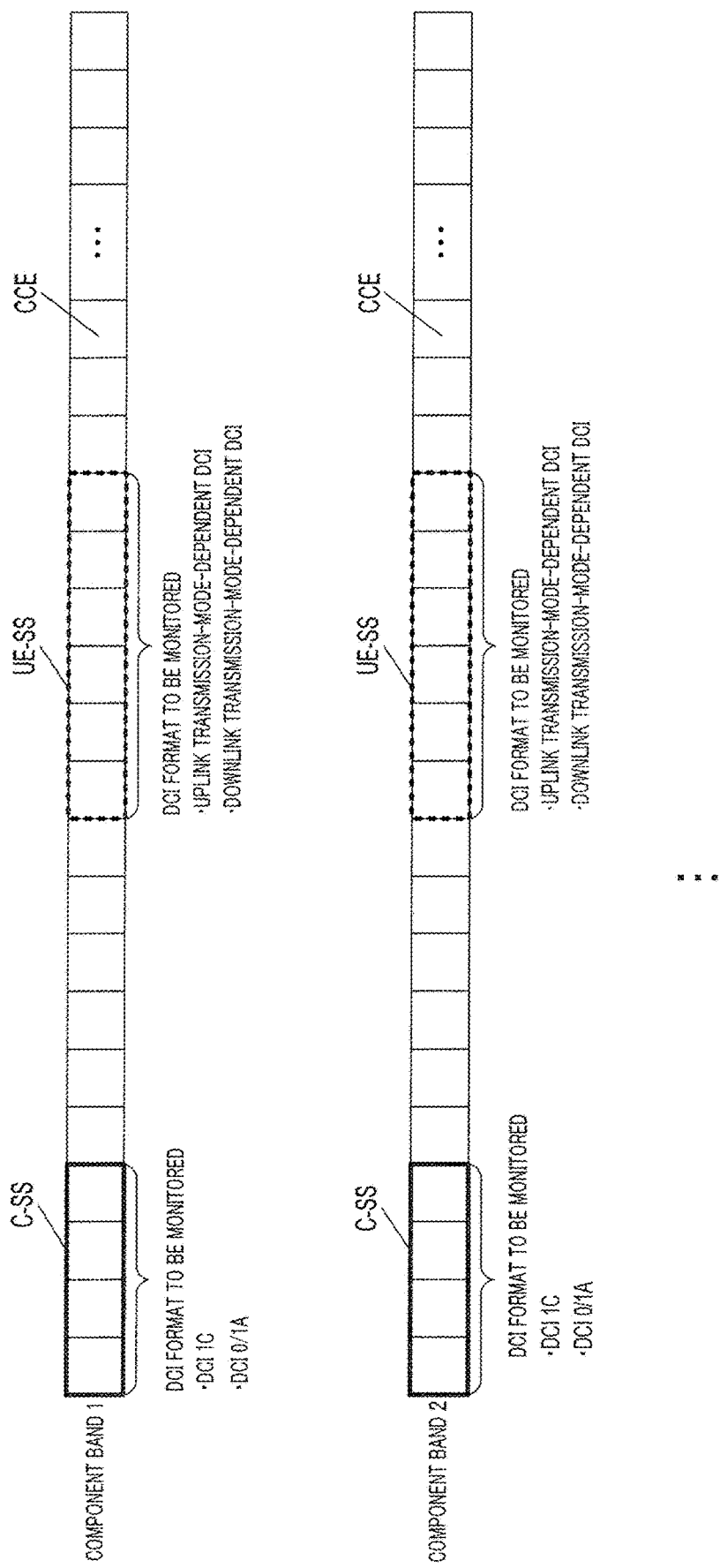
FIG. 7 is a diagram illustrating CCE assignment processing and blind decoding (monitoring) processing according to Embodiment 3 of the present invention.

Furthermore, in the following descriptions, component band configuration section 101 (FIG. 1) of base station 100 configures a plurality of downlink component bands (component bands 1, 2, . . . ) for terminal 200 (LTE-A terminal) as in the case of Embodiment 1 (FIG. 5) as shown in FIG. 7. Furthermore, in FIG. 7, base station 100 assumes that the number of CCEs making up a C-SS set in each component band is four and the number of CCEs making up a UE-SS of each component band configured for terminal 200 is six as in the case of Embodiment 1 (FIG. 5).

For a terminal for which a plurality of component bands are configured, when assignment control information included in a PDCCH signal addressed to the terminal is a format common to all terminals (e.g., DCI 1C, 0/1A), assignment section 106 of base station 100 (FIG. 1) according to the present embodiment assigns the PDCCH signal only to CCEs within C-SSs of respective C-SSs and UE-SSs set in a plurality of component bands configured for the terminal. Furthermore, when assignment control information included in the PDCCH signal is a transmission-mode-dependent DCI format (e.g., DCI 1, 2, 2A, 0A, 0B), assignment section 106 assigns the PDCCH signal to CCEs within a UE-SS set in the terminal in each component band as in the case of Embodiment 1. In this case, assignment section 106 assigns assignment control information to CCEs in a component band in which data subject to resource assignment indicated by the assignment control information is transmitted.

Specifically, assignment section 106 assigns a PDCCH signal including assignment control information for shared channels (DCI 1C, 1A) and a PDCCH signal including assignment control information for data assignment common to all terminals (DCI 0/1A) to any one of respective C-SSs set in a plurality of component bands (component bands 1, 2, . . . ) shown in FIG. 7. On the other hand, assignment section 106 assigns a PDCCH signal including transmission-mode-dependent assignment control information (uplink (DCI 0A, 0B), downlink (DCI 1, 2, 2A)) set in terminal 200 to CCEs in the respective UE-SSs of a plurality of component bands (component bands 1, 2, . . . ) shown in FIG. 7.

That is, for a terminal for which a plurality of component bands are configured, assignment control information of DCI 0/1A is assigned only to CCEs within a C-SS of each component band and only assignment control information in a transmission-mode-dependent DCI format is assigned to a UE-SS of each component band.

On the other hand, when a plurality of downlink component bands are indicated by band information input from configuration information reception section 206, PDCCH reception section 207 of terminal 200 (FIG. 3) performs blind decoding on a format common to all terminals for a C-SS of each component band configured for this terminal. Furthermore, PDCCH reception section 207 performs blind decoding on a DCI format corresponding to a transmission mode set in this terminal for a UE-SS of each component band configured for this terminal.

Specifically, PDCCH reception section 207 performs blind decoding on a PDCCH signal including assignment control information for shared channels (DCI 1C, 1A) and a PDCCH signal including assignment control information for data assignment common to all terminals (DCI 0/1A) for respective C-SSs of the plurality of component bands (component bands 1, 2, . . . ) shown in FIG. 7. Furthermore, PDCCH reception section 207 performs blind decoding on a PDCCH signal including transmission-mode-dependent assignment control information (uplink (DCI 0A, 0B), downlink (DCI 1, 2, 2A)) for respective UE-SSs of the plurality of component bands (component bands 1, 2, . . . ) shown in FIG. 7.

That is, when a plurality of component bands are configured for this terminal, PDCCH reception section 207 performs blind decoding (monitoring) on a DCI format common to all terminals (DCI 1C, 0/1A) only for a C-SS of a C-SS and UE-SS set in each component band. That is, PDCCH reception section 207 does not perform blind decoding (monitoring) on a PDCCH signal including assignment control information for data assignment common to all terminals (DCI 0/1A) in a UE-SS of each component band. That is, PDCCH reception section 207 performs blind decoding on two types of DCI format (DCI 1C and DCI 0/1A) in a C-SS of each component band shown in FIG. 7 and performs blind decoding on two types of DCI format (uplink transmission-mode-dependent DCI (DCI 0A, 0B) and downlink transmission-mode-dependent DCI (DCI 1, 2, 2A)) in a UE-SS of each component band.

Regarding a reduction of a blind decoding count, for example, a case will be described where as shown, for example, in FIG. 2, blind decoding is performed six times on each DCI format for a C-SS and blind decoding is performed 16 times on each DCI format for a UE-SS. In this case, PDCCH reception section 207 performs blind decoding a total of 44 (=(6×2)+(16×2)) times per component band. That is, it is possible to reduce the blind decoding count by a blind decoding count (16 times) corresponding to one type of DCI format (DCI 0/1A) in a UE-SS of each component band shown in FIG. 7.

For example, when five component bands are configured for terminal 200, when terminal 200 performs blind decoding on five types of DCI format in all component bands, blind decoding needs to be performed a total of 300 times (60 times×5) as described above. By contrast, the present embodiment requires blind decoding to be performed a total of 220 times (=44 times×5). That is, the present embodiment reduces blind decoding by 80 times (=16 times×5).

Furthermore, base station 100 needs only to transmit assignment control information of DCI 0/1A using any one C-SS of a plurality of component bands configured for terminal 200. This allows base station 100 to select a component band in which control information of an upper layer reported through DCI 0/1A (e.g., control information reporting a change to an emergency-evacuation-like transmission mode) is transmitted from among a plurality of component bands, and it is thereby possible to improve the degree of freedom of data assignment as in the case of Embodiment 2. The above-described upper-layer control information may be transmitted in any one of a plurality of less frequently used component bands configured for terminal 200. Therefore, even when base station 100 transmits assignment control information of DCI 0/1A using only a C-SS of each component band, the possibility of the CCE block rate increasing due to contention of CCEs with other terminals is low.

Thus, according to the present embodiment, when a plurality of component bands are configured for the terminal, the base station assigns assignment control information for data assignment common to a plurality of terminals only to a C-SS of each component band. As described above, the blind decoding count in the terminal can be reduced by an amount corresponding to the blind decoding on assignment control information for data assignment common to a plurality of terminals in a UE-SS that becomes unnecessary. Furthermore, since the base station can select a component band to assign assignment control information for data assignment common to a plurality of terminals from among a plurality of component bands configured for the terminal, the possibility of the CCE block rate increasing due to contention of CCEs with other terminals decreases. Thus, the present embodiment can reduce the blind decoding count of the terminal even when a plurality of component bands are configured for the terminal without increasing the CCE block rate as in the case of Embodiment 1.

Embodiment 4

The present embodiment differs from Embodiment 2 in that, when a plurality of component bands are configured for a terminal, all search spaces corresponding to the plurality of component bands are set in an anchor band configured for the terminal.

Hereinafter, the present embodiment will be described more specifically. Base station 100 (FIG. 1) and terminal 200 (FIG. 3) according to the present embodiment have configurations similar to those of Embodiment 1, but the operation of component band configuration section 101, search space setting section 103, assignment section 106, configuration information reception section 206 and PDCCH reception section 207 differs.

In addition to processing similar to that in Embodiment 1, component band configuration section 101 of base station 100 (FIG. 1) according to the present embodiment configures one component band (hereinafter also referred to as "PDCCH transmission component band) used for transmission of a PDCCH signal for each terminal. For example, component band configuration section 101 configures an anchor band of each terminal as a PDCCH transmission component band.

In a terminal for which a plurality of component bands are configured, search space setting section 103 sets the same number of UE-SSs as the plurality of component bands configured for the terminal in the PDCCH transmission component band configured by component band configuration section 101. That is, search space setting section 103 sets search spaces corresponding to the plurality of component bands configured for the terminal in the PDCCH transmission component band. That is, search space setting section 103 sets all UE-SSs corresponding to the plurality of component bands configured for the terminal in a specific component band (anchor band, that is, PDCCH transmission component band). For example, search space setting section 103 sets L CCEs starting from a CCE number calculated using a terminal ID of the terminal and a hash function that performs randomization in a UE-SS of a first component band, and sets L CCEs starting from a CCE next to the CCE (last CCE) set in the UE-SS of the first component band in a UE-SS of a second component band.

When assignment control information included in a PDCCH signal addressed to a terminal for which a plurality of component bands are configured is a DCI format common to all terminals (DCI 0/1A) and a CI is added thereto, assignment section 106 assigns the PDCCH signal to CCEs within a UE-SS corresponding to an anchor band configured for the terminal among UE-SSs corresponding to a plurality of component bands set in a PDCCH transmission component band set by search space setting section 103. On the other hand, when assignment control information included in the PDCCH signal is a DCI format common to all terminals (DCI 0/1A) and no CI is added thereto, assignment section 106 assigns the PDCCH signal to CCEs within a C-SS. Furthermore, when the assignment control information included in the PDCCH signal is a transmission-mode-dependent DCI format (DCI 0/1A), assignment section 106 assigns the PDCCH signal to a UE-SS corresponding to a component band in which data subject to resource assignment indicated by the assignment control information is transmitted among a plurality of UE-SSs set in the PDCCH transmission component band. Thus, assignment section 106 assigns all PDCCH signals addressed to a terminal for which a plurality of component bands are configured to a PDCCH transmission component band.

On the other hand, configuration information reception section 206 of terminal 200 (FIG. 3) reads information indicating a PDCCH transmission component band configured for this terminal from a control signal input from separation section 205 and outputs the information to PDCCH reception section 207.

PDCCH reception section 207 calculates a UE-SS corresponding to each component band configured for this terminal in the same way as search space setting section 103 in a PDCCH transmission component band indicated by the information input from configuration information reception section 206. PDCCH reception section 207 performs blind decoding (monitoring) on a UE-SS corresponding to each calculated component band focused on a DCI format corresponding to a transmission mode set in this terminal. Furthermore, PDCCH reception section 207 performs blind decoding only on a UE-SS corresponding to an anchor band (specific component band) among UE-SSs corresponding to a plurality of component bands set in the PDCCH transmission component band focused on a DCI format common to all terminals (DCI 0/1A (with a CI)). That is, PDCCH reception section 207 performs blind decoding (monitoring) only on CCEs within a UE-SS corresponding to an anchor band (specific component band) among UE-SSs corresponding to a plurality of component bands set in the anchor band (specific component band), and thereby acquires assignment control information with a CI. Here, when assignment control information with a CI is acquired as a result of performing blind decoding (monitoring) on the UE-SS corresponding to the anchor band, terminal 200 assigns data (e.g., control information of an upper layer) based on the resource assignment information indicated by the assignment control information in the component band indicated by the CI.

Next, details of PDCCH signal assignment processing in assignment section 106 of base station 100 and blind decoding (monitoring) processing in PDCCH reception section 207 of terminal 200 will be described.

Figure 8:
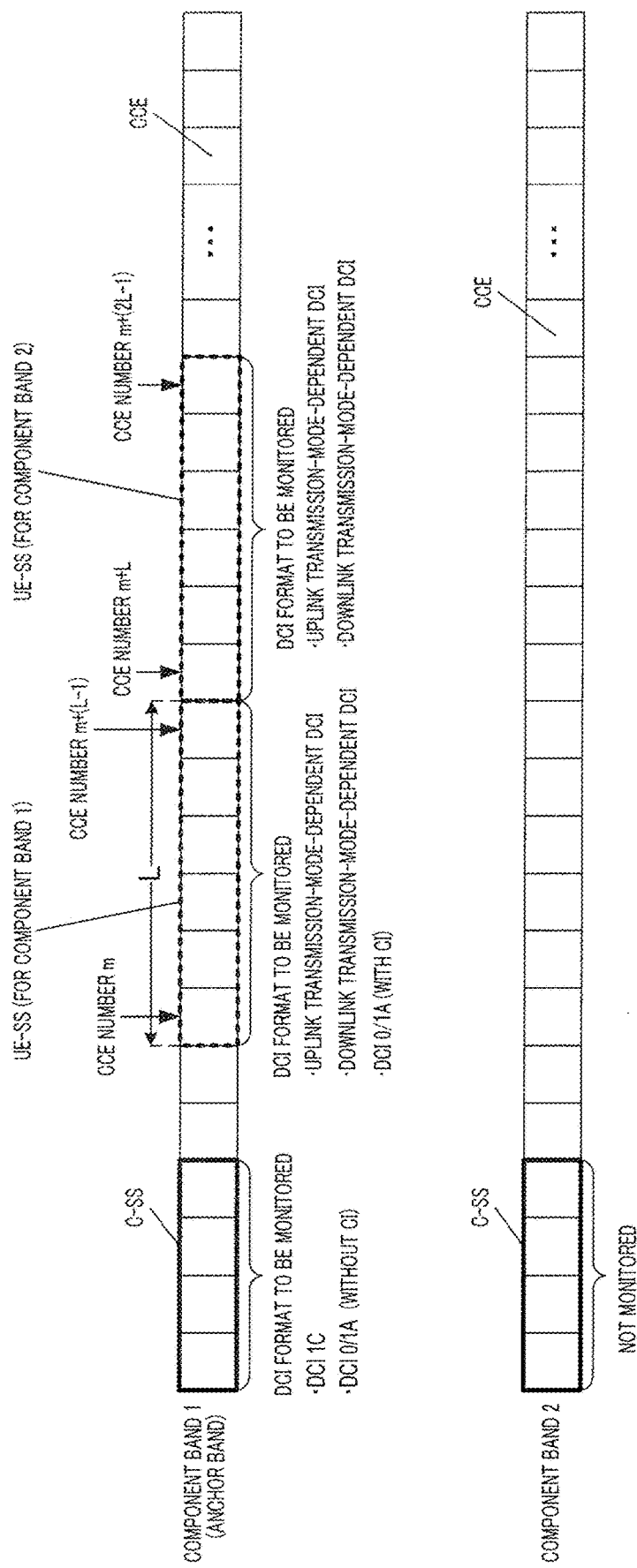
FIG. 8 is a diagram illustrating CCE assignment processing and blind decoding (monitoring) processing according to Embodiment 4 of the present invention.

In the following description, as shown in FIG. 8, component band configuration section 101 (FIG. 1) of base station 100 configures a plurality of downlink component bands (component bands 1, 2, ... ) for terminal 200 (LTE-A terminal) as in the case of Embodiment 1 (FIG. 5). Furthermore, component band configuration section 101 configures component band 1 as an anchor band of terminal 200 as shown in FIG. 8. Furthermore, component band configuration section 101 configures component band 1 (anchor band) shown in FIG. 8 as a PDCCH transmission component band. The PDCCH transmission component band is separately reported to terminal 200 as upper-layer control information (RRC control information). As the PDCCH transmission component band, for example, a component band having a good channel situation (component band having a higher SIR, component band having higher receiving power, component band having smaller channel attenuation (path loss)) or a component band with less interference from other cells is configured.

Furthermore, in FIG. 8, base station 100 assumes that the number of CCEs making up a C-SS set in each component band is four and the number of CCEs making up a UE-SS in each component band configured for terminal 200 is six as in the case of Embodiment 1 (FIG. 5).

For terminal 200 for which a plurality of component bands are configured, search space setting section 103 of base station 100 sets all UE-SSs corresponding to the plurality of component bands configured for terminal 200 in component band 1 (anchor band) which is a PDCCH transmission component band.

For example, assuming that a CCE number calculated from the terminal ID of terminal 200 and a hash function is m and the number of CCEs making up a search space is L, search space setting section 103 sets CCEs of CCE numbers m to (m+(L−1)) in UE-SSs corresponding to component band 1 (anchor band) as shown in FIG. 8. Similarly, search space setting section 103 sets CCEs of CCE numbers (m+L) to (m+(2L−1)) in UE-SSs corresponding to component band 2 as shown in FIG. 8. That is, search space setting section 103 sets CCE numbers (m+(k−1)L) to (m+(kL−1)) in search spaces corresponding to component band k. When a CCE number reaches the last CCE number, search space setting section 103 may reset the CCE number to 0, that is, adopt mod NCCE for CCE numbers used for setting search spaces. Here, "mod" is a modulo operation and "NCCE" is the number of CCEs making up a PDCCH of a PDCCH transmission component band.

In component band 1 (PDCCH transmission component band) shown in FIG. 8, assignment section 106 assigns a PDCCH signal whose assignment control information has no CI among PDCCH signals including assignment control information for data assignment common to all terminals (DCI 0/1A) to CCEs within a C-SS and assigns a PDCCH signal whose assignment control information has a CI to CCEs within a UE-SS corresponding to component band 1 which is an anchor band.

Furthermore, in component band 1 (PDCCH transmission component band) shown in FIG. 8, assignment section 106 assigns transmission-mode-dependent assignment control information (uplink (DCI 0A, 0B), downlink (DCI 1, 2, 2A)) set in terminal 200 to CCEs in a UE-SS corresponding to a component band in which data subject to resource assignment indicated by the assignment control information is transmitted. For example, when the component band in which data subject to resource assignment indicated by the transmission-mode-dependent assignment control information is transmitted is assumed to be component band 2 shown in FIG. 8, assignment section 106 assigns a PDCCH signal including the assignment control information to CCEs in a UE-SS corresponding to component band 2 in component band 1 shown in FIG. 8.

On the other hand, PDCCH reception section 207 of terminal 200 performs blind decoding on a PDCCH signal including assignment control information for shared channels (DCI 1C, 1A) and a PDCCH signal including assignment control information for data assignment common to all terminals (DCI 0/1A (without a CI)) for the C-SS of component band 1 (anchor band) shown in FIG. 8. Furthermore, PDCCH reception section 207 performs blind decoding on a PDCCH signal including transmission-mode-dependent assignment control information (uplink (DCI 0A, 0B), downlink (DCI 1, 2, 2A)) for UE-SSs corresponding to component bands (component bands 1, 2, ... ) configured for this terminal in component band 1 shown in FIG. 8.

Furthermore, PDCCH reception section 207 performs blind decoding on a PDCCH signal including assignment control information for data assignment common to all terminals (DCI 0/1A (with a CI)) for a UE-SS corresponding to component band 1 which is an anchor band among UE-SSs corresponding to a plurality of component bands set in component band 1 (PDCCH transmission component band) shown in FIG. 8. At this time, PDCCH reception section 207 performs blind decoding focused on the size of assignment control information with a CI.

Thus, upon acquiring assignment control information of DCI 0/1A addressed to this terminal in a UE-SS corresponding to component band 1 set in component band 1 shown in FIG. 8, terminal 200 identifies a component band indicated by the CI added to the assignment control information as a component band subject to resource assignment. That is, although base station 100 transmits assignment control information of DCI 0/1A for terminal-specific data assignment using only an anchor band (PDCCH transmission component band) configured for terminal 200 as in the case of Embodiment 2, base station 100 can assign data to a plurality of component bands.

Thus, as in the case of Embodiment 2, base station 100 can select a component band to transmit data such as control information of an upper layer to be reported using DCI 0/1A (e.g., control information reporting a change to an emergency-evacuation-like transmission mode) for each transmission timing (e.g., in subframe units), and thereby improves the degree of freedom of data assignment. For example, base station 100 follows an instantaneous variation in a channel situation in subframe units, can thereby transmit data such as control information of an upper layer in a component band having a good channel situation, and can thereby realize data transmission at a high coding rate, that is, high efficiency data transmission with a small number of resources.

Furthermore, assignment control information of DCI 0/1A is assigned only to component band 1 (PDCCH transmission component band) shown in FIG. 8. Therefore, for assignment information of DCI 0/1A, terminal 200 needs only to designate only component band 1 which is a PDCCH transmission component band as a blind decoding (monitoring) target. Thus, as in the case of Embodiment 1, it is possible to reduce the blind decoding count of terminal 200 for which a plurality of component bands are configured.

Furthermore, base station 100 can set a component band having a good channel situation as a PDCCH transmission component band for each terminal. Thus, the base station can transmit a PDCCH signal to each terminal in a component band having a good channel situation, and can thereby improve an error rate characteristic of the PDCCH signal and realize signal transmission at a high coding rate, that is, high efficiency signal transmission with a small number of resources (number of CCEs).

Thus, even when a plurality of component bands are configured for a terminal, the present embodiment can reduce the blind decoding count of the terminal without increasing a CCE block rate as in the case of Embodiment 1. Furthermore, the present embodiment adds a CI to assignment control information of DCI 0/1A assigned to a UE-SS, and can thereby improve the degree of freedom of data assignment as in the case of Embodiment 2. Furthermore, the present embodiment sets all search spaces to transmit PDCCH signals in a plurality of component bands in one component band having a good channel situation, and can thereby improve error rate characteristics of PDCCH signals.

In the present embodiment, a PDCCH transmission component band may also be set in common to all terminals for each cell. For example, when frequency bands of a plurality of component bands are different (e.g., component band 1 is an 800 MHz band and component band 2 is 3.4 MHz band), the base station may set the component band having a lower frequency (component band 1 of an 800 MHz band) as the PDCCH transmission component band. Here, the lower the frequency of the frequency band, the smaller is the channel attenuation (path loss). Therefore, by setting a component band having a lower frequency as the PDCCH transmission component band, it is possible to realize robuster and high efficiency signal transmission.

Furthermore, the present embodiment may also apply a configuration in which no CI is added to assignment control information of DCI 0/1A. In the present embodiment, assignment control information of DCI 0/1A is assigned to a UE-SS corresponding to a PDCCH transmission component band (component band 1 which is an anchor band in FIG. 8). Therefore, by the base station selecting a component band having a good channel situation as the PDCCH transmission component band beforehand, it is possible to transmit assignment control information of DCI 0/1A and data subject to resource assignment indicated by the assignment control information in a PDCCH transmission component band which is a component band having a good channel situation without adding a CI for indicating a component band having a good channel situation.

Furthermore, a case has been described in the present embodiment where assignment control information of DCI 0/1A is assigned to a UE-SS corresponding to an anchor band. However, in the present embodiment, the UE-SS to which assignment control information of DCI 0/1A is assigned is not limited a UE-SS corresponding to an anchor band, but assignment control information may be assigned to a UE-SS corresponding to any component band. No matter to which component band a UE-SS corresponds to which assignment control information of DCI 0/1A is assigned, the terminal needs only to perform blind decoding on DCI 0/1A using only a UE-SS corresponding to one component band of UE-SSs corresponding to a plurality of component bands, and therefore the blind decoding count of the terminal can be reduced as in the case of the above embodiments.

A case has been described in the present embodiment where the number of PDCCH transmission component bands is one, but the number of PDCCH transmission component bands may also be plural in the present invention.

Furthermore, the PDCCH transmission component band used in the present embodiment may also be referred to as "UE PDCCH component carrier set."

This concludes a description of embodiments of the present invention.

Band aggregation may also be referred to as "carrier aggregation." Also, band aggregation is not limited to a case in which continuous frequency bands are aggregated, and non-continuous frequency bands may also be aggregated.

In the present invention, a C-RNTI (Cell-Radio Network Temporary Identifier) may be used as a terminal ID.

In the above embodiments, a case has been described in which a component band is defined as a band that has a maximum width of 20 MHz, and is a basic communication band unit. However, a component band may also be defined as follows. For example, a downlink component band may be defined as a band delimited by downlink frequency band information in a BCH (Broadcast Channel) notified from a base station, or a band defined by a distribution width when a PDCCH is subjected to distributed placement in a frequency band. Also, an uplink component band may also be defined as a band delimited by uplink frequency band information in a BCH notified from a base station, or a basic communication band unit of 20 MHz or less that includes a PUSCH near the center and a PUCCH at both ends. A component band may also be referred to as a component carrier in LTE.

Furthermore, as for a component band configured as an anchor band, the present invention may configure a component band configured beforehand in the system (e.g., component band that transmits SCH or P-BCH) or a component band common to terminals for each cell or different component bands for each terminal.

Furthermore, an anchor band may also be referred to as "anchor carrier," "master band (master carrier)" or "primary band (primary carrier)."

Furthermore, in the above embodiments, the expression "DCI format common to all terminals" may also be read as "DCI format independent of transmission mode."

A case has been described in the above embodiments where DCI 0/1A is used as a "DCI format common to all terminals." However, in the present invention, the "DCI format common to all terminals" is not limited to DCI 0/1A, but may be any DCI format used independently of the transmission mode.

Furthermore, a case has been described in the above embodiments where DCI 0A, 0B, 1, 2, 2A is used as the transmission-mode-dependent DCI. However, the present invention may also use any format other than DCI 0A, 0B, 1, 2, 2A as the transmission-mode-dependent DCI.

Furthermore, the present invention may also use DCI 0 (continuous band assignment transmissions on an uplink) and DCI 1A (continuous band assignment transmissions on a downlink) as the transmission-mode-dependent DCI. In this case, the DCI format common to all terminals (DCI 0/1A) and transmission-mode-dependent DCI format are identical. For this reason, in a UE-SS set in a terminal, the terminal may perform blind decoding focused on one type of DCI format on an uplink (DCI 0, 0A, 0B) and downlink (1, 1A, 2, 2A). When the transmission modes of the uplink and downlink are both continuous band assignment (in the case of DCI 0/1A), the terminal may perform blind decoding focused on one type of DCI format combining the uplink and downlink. By this means, DCI 0/1A may be used as a transmission-mode-dependent DCI having a wider search space. In this way, the base station can also assign assignment control information of DCI 0/1A to CCEs in a wider search space to also a terminal having a poor channel situation to which only assignment control information of DCI 0/1A can be assigned, and can thereby prevent the CCE block rate from increasing.

Furthermore, a component band configured for each terminal may be configured for an uplink and downlink independently. Furthermore, a component band configured for an uplink may also be referred to as "UE UL Component Carrier Set" and a component band configured for a downlink may also be referred to as "UE DL Component Carrier Set."

A case has been described in above Embodiments 2 and 4 where a CI bit is added when performing data assignment in different component bands. However, the present invention is not limited to a case where a CI bit is added, but different component bands may be indicated using other methods. For example, the CRC portion may be masked with a code corresponding to a component band subject to assignment or different search spaces may be set for each component band subject to assignment to thereby distinguish between component bands subject to assignment.

A CCE described in the above embodiments is a logical resource, and when placed on an actual physical time/frequency resource, CCE distribution is performed across the entire band within a component band. Also, as long as CCEs functioning as logical resources are divided on an individual component band basis, CCE placement on an actual physical time/frequency resource may be distributed across the entire system band (that is, all component bands).

A mobile station may also be referred to as UE, and a base station as Node B or BS (Base Station). A terminal ID may also be referred to as UE-ID.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-188721, filed on Aug. 17, 2009, including the specification, drawings and abstract is incorporated herein by reference in its entirety.

INDUSTRIAL APPLICABILITY

The present invention is suitable for use in a mobile communication system or the like.

REFERENCE SIGNS LIST 100 base station
101 component band configuration section
102 control section
103 search space setting section
104 PDCCH generation section
105, 107, 108 encoding/modulation section
106 assignment section
109 multiplexing section
110, 213 IFFT section
111, 214 CP addition section
112, 215 radio transmission section
113, 201 antenna
114, 202 radio reception section
115, 203 CP removal section
116, 204 FFT section
117 extraction section
118 IDFT section
119 data reception section
120 ACK/NACK reception section
200 terminal
205 separation section
206 configuration information reception section
207 PDCCH reception section
208 PDSCH reception section
209, 210 modulation section
211 DFT section
212 mapping section

The invention claimed is:

1. A process controlled by an integrated circuit, the process comprising:
   receiving control information including resource assignment information, the control information being received in a common search space that is common to a plurality of terminals or a UE specific search space that is specific to a terminal; and
   decoding the control information, wherein:
   the control information including a carrier indicator that indicates one of a plurality of component carriers is received in the UE specific search space; and
   the control information including no carrier indicator is received only in the common search space,
   wherein UE specific search spaces, which respectively correspond to the plurality of component carriers, are configured in a primary component carrier of the plurality of component carriers.

2. The process controlled by the integrated circuit according to claim 1, wherein the carrier indicator indicates the component carrier, in which a resource is allocated by the resource assignment information.

3. The process controlled by the integrated circuit according to claim 1, wherein the control information is received in a primary component carrier of the plurality of component carriers.

4. An integrated circuit comprising circuitry, which, in operation:
   controls reception of control information including resource assignment information, the control information being received in a common search space that is common to a plurality of terminals or a UE specific search space that is specific to a terminal; and
   decodes the control information, wherein:
   the control information including a carrier indicator that indicates one of a plurality of component carriers is received in the UE specific search space; and
   the control information including no carrier indicator is received only in the common search space,
   wherein UE specific search spaces, which respectively correspond to the plurality of component carriers, are configured in a primary component carrier of the plurality of component carriers.

5. The integrated circuit according to claim 4, comprising:
   at least one input coupled to the circuitry, wherein the at least one input, in operation, inputs data; and
   at least one output coupled to the circuitry, wherein the at least one output, in operation, outputs data.

6. The integrated circuit according to claim 4, wherein the carrier indicator indicates the component carrier, in which a resource is allocated by the resource assignment information.

7. The integrated circuit according to claim 4, wherein the control information is received in a primary component carrier of the plurality of component carriers.

8. The integrated circuit according to claim 4, comprising:
   reception circuitry, which, in operation, controls the reception; and
   decoding circuitry, which, in operation, decodes the control information.

9. A non-transitory computer-readable medium having contents which cause processing circuitry to perform a method, the method comprising:
   receiving control information including resource assignment information, the control information being received in a common search space that is common to a plurality of terminals or a UE specific search space that is specific to a terminal; and
   decoding the control information, wherein:
   the control information including a carrier indicator that indicates one of a plurality of component carriers is received in the UE specific search space; and
   the control information including no carrier indicator is received only in the common search space,
   wherein UE specific search spaces, which respectively correspond to the plurality of component carriers, are configured in a primary component carrier of the plurality of component carriers.

10. The non-transitory computer-readable medium according to claim 9, wherein the contents comprise configuration settings.

* * * * *